United States Patent

Miyashita et al.

[11] Patent Number: 5,828,784
[45] Date of Patent: Oct. 27, 1998

[54] DATA CODING METHOD AND APPARATUS USING A PLURALITY OF BLOCKS OF DIFFERENT LENGTH

[75] Inventors: Atsushi Miyashita, Tokorozawa; Yuuichi Oonami, Iruma, both of Japan

[73] Assignee: Hitachi Denshi Kabushiki Kaisha, Tokyo, Japan

[21] Appl. No.: 435,957

[22] Filed: May 5, 1995

Related U.S. Application Data

[63] Continuation-in-part of Ser. No. 91,182, Jul. 13, 1993, abandoned.

[30] Foreign Application Priority Data

Jul. 13, 1992 [JP] Japan .................................. 04-208466
Jul. 13, 1992 [JP] Japan .................................. 04-208467

[51] Int. Cl.$^6$ .................................................. G06K 9/36
[52] U.S. Cl. .................................................. 382/232
[58] Field of Search ............................ 382/232, 236, 382/239, 240, 243, 248, 250; 358/261.2, 261.3, 432, 433; 348/394, 395, 400–409, 412–418, 420, 421, 425, 430, 431

[56] References Cited

U.S. PATENT DOCUMENTS

| | | | |
|---|---|---|---|
| 4,509,194 | 4/1985 | Harrington | 382/245 |
| 4,831,659 | 5/1989 | Miyaoka et al. | 382/240 |
| 5,608,458 | 3/1997 | Chen et al. | 348/413 |
| 5,714,950 | 2/1998 | Jeong et al. | 348/408 |
| 5,715,004 | 2/1998 | Chun et al. | 348/403 |

*Primary Examiner*—Jose L. Couso
*Attorney, Agent, or Firm*—Antonelli, Terry, Stout & Kraus, LLP

[57] ABSTRACT

In a data coding method for obtaining coded data by dividing input data into different-length division blocks, the input data is divided into different-length blocks in accordance with a distortion value indicative of an error between the input data and approximate data based on the input data; variable length quantized data is obtained by quantizing the approximate data associated with the input data of each of the blocks; status data indicative of the state in which the input data is divided into the blocks is obtained; and the coded data is obtained by combining the quantized data and the status data. When the input data is divided into a plurality of blocks of unequal lengths, the amount of the coded data is determined so that it is substantially coincident with a predetermined data amount.

15 Claims, 14 Drawing Sheets

DIFFERENT-
LENGTH BLOCK
(HIERARCHICAL
BLOCK
STRUCTURE)

※ NUMBERS AT NODES CORRESPOND
TO BLOCKS OF SAME NUMBERS
IN FIG. 3C

DATA CODING METHOD AND APPARATUS USING A PLURALITY OF BLOCKS OF DIFFERENT LENGTH

This application is a continuation-in-part of Ser. No. 08/091,182, filed Jul. 13, 1993, now abandoned.

BACKGROUND OF THE INVENTION

This invention relates to a data coding method and apparatus for processing input data (including image data and other data) in certain blocks as units to produce coded data, which can be used as compressed data.

A different-length block division coding system is proposed which makes an adaptive data-coding or-compressing process on input image data in accordance with the change of the input image data, as disclosed in, for example, Japanese Patent Laid-open Gazette No. 62-252217 (JP-A-62-252217) A different length block division coding system means a coding system for dividing data into rectangular blocks of unequal length. In this system, a rapidlychanged luminance part of the input image data is processed in a small-sized block, while a slowly-changed luminance part thereof is processed in a large-sized block. Then, the luminance change in each block is converted into the coefficients of an approximate equation, and the coefficients are quantized and coded. In the different-length block division coding system, the input data is divided into fundamental process blocks of a fixed size which are called subblocks. Here, for convenience of explanation, the input data is treated as image data, and the size of each subblock is assumed to be 16 pixels×16 pixels. Thus, this subblock has one 16 pixels×16 pixels block as a root, and at the same time has an hierarchical structure of four 8 pixels×8 pixels blocks, sixteen 4 pixels×4 pixels blocks, and sixty-four 2 pixels×2 pixels blocks. The slowly-changed image part is expressed by 16×16 size, and the rapidly-changed image part by a combination of 4×4 and 2×2 sizes.

Whether the luminance change is slow or rapid is determined in the following way. First, a distortion value Q indicates the difference, or error between the original image value and an approximate image value approximated by each block size. If the luminance change is slow, it can be satisfactorily approximated by a large-sized block of 16×16, and thus the distortion value Q as the error relative to the original image is small. If the luminance change is rapid, it cannot be satisfactorily approximated by a large-sized block of 16×16, and thus the distortion value Q is large. Thus, if the input image data is repeatedly divided by different block sizes until the distortion Q reaches a predetermined value (hereinafter, referred to as the allowable distortion value Qp), the slowly-changed image part and the rapidly-changed image part can be automatically divided and approximated by 16×16 and 4×4 or 2×2 sizes, respectively.

In this coding system, a header for indicating the adaptive processing, or block division is added to the coded data. The header-added coded data can be properly decoded by analyzing this header because the information on the block division upon coding can be known from the header.

The different-length block division coding system disclosed in the Japanese Patent Laid-open Gazette No. 62-252217, however, has the drawback that the amount of compressed and coded data is not constant because the distortion value Q, or error between the input data and the compressed, coded and decoded data is maintained to be less than the allowable distortion value Qp by the block division. Therefore, according to this system, the incoming moving image data cannot be continuously compressed and recorded on the digital VTR which has a lower input/output data rate than that of the moving image. In other words, the compressed code of a constant rate cannot be produced by this system.

To improve this system, another compressing coding method, as disclosed in Japanese Patent Laid-open Gazette No. 3-274919 (JP-A-3-274919), was proposed in which the amount of data can be controlled to be a constant amount Dt. In this method, the error, or the distortion value Q is determined for all the division blocks which are able to appear in one frame of the image to be examined, and histogram information is produced which shows the relation between this distortion value Q and the number N (Q) of the corresponding division blocks. Then, the relationship between the allowable distortion Qp and the amount of data D at the time of coding is known from this histogram information. Also, the allowable distortion Qp corresponding to the externally specified data amount Dt is determined from the relationship. By coding input data according to this value Qp, it is possible to obtain the compressed, coded data of which the amount of data is controlled to be constant. The allowable distortion value Qp for the specified data amount Dt will hereinafter be called as the distortion threshold value Qthd. According to this method, the allowable value Qp and distortion threshold value Qthd change dynamically with the input data.

The different-length block division coding system disclosed in the Japanese Patent Laid-open Gazette No. 3-274919 is limited to the process in which the approximate data associated with each block is quantized as a fixed-length data. Also, as described in the Japanese Patent Laid-open Gazette No. 3-274919, when the approximate data is quantized by the division blocks being variable in length, each of which has a different number of blocks, a plurality of different kinds of approximate data are obtained, so that histograms for the different kinds of approximate data are produced in a RAM and the approximate data is coded on the basis of the histograms. However, although the quantization of approximate data in the variable length is simply described in this Gazette, no means for controlling the data amount to be constant is provided in the description of the quantization of approximate data in variable length.

Here, the meaning of this quantization will be described. Since the approximate coefficient group (for example, the gradient of an approximate plane in the horizontal direction H, and the gradient and DC component of the plane in the vertical direction V) requires data of the longest length, 32 bits even for the minimum block of 2×2 size, the quantization is a part of the compressing process for expressing the approximate coefficient group in a code of about 16 bits to reduce the data. Specifically, for example, the approximate coefficient group of a length equal to or shorter than 16 bits which occurs at a high frequency is assigned to a code of 16 bits, but the approximate coefficient group of over 16 bits which rarely occurs undergoes clipping, is regarded as having a length of 16 bits, and is assigned to a small number of codes.

The whole construction of such compression coding system as disclosed in the Japanese Patent Laid-open Gazette No. 3-274919 will be described with reference to FIG. 17.

Input data 101 is supplied through a buffer memory 100 to a converter 102, where it is converted into approximate data 103 of all division block sizes which can appear due to block division and is quantized to be expressed in a fixed length of bits. The approximate data 103 and the input data 101 are supplied to a distortion calculator 108, which then produces a distortion value 109, which indicates the error between the decoded data of the approximate data 103 and the input data 101, for the division blocks of all sizes which can be developed. It is now assumed that the allowable distortion value for giving the externally specified compression coded data amount (specified data amount) Dt is called as the distortion threshold value Qthd. If the distortion threshold value Qthd 114-1 is definite, a different-length block divider 104 compares the distortion value 109 of each division block and the distortion threshold value Qthd 114-1 to select blocks having distortion values smaller than the distortion threshold value Qthd 114-1, produces approximate data of these blocks and a header indicative of the state of the block division, and forms compressed data 107 on the basis of the approximate data and header.

The distortion calculator 108 produces the distortion values 109 of the division blocks of all sizes which probably appear within the image of one frame unit. A histogram generator 110 causes the histogram information showing the relationship between these distortion values and the number N (Qp) 114-3 of the blocks having the corresponding distortion values to be generated in a memory 112. An example of the histogram information is conceptually shown in FIGS. 18A through 18C. Here, N(X) indicates the number of blocks having distortion value X. The memory 112, after completion of histogram information, produces the number of division blocks having distortion values specified according to a signal Qp 114-4 from the distortion threshold value calculator 114. The distortion threshold calculator 114 determines the allowable distortion value Qp at which ΣD (Qp), or compressed data amount reaches a specified amount Dt which is the predetermined value designated by 114-2, and produces this Qp as a distortion threshold value Qthd indicated by 114-1.

A specific process for obtaining the distortion threshold value Qthd will be described below. The distortion threshold value calculator 114 first determines an initial amount D which is the compressed data amount when the allowable distortion value Qp is at its maximum value (for example, 255). When the approximate coefficient is expressed in fixed length, the calculation is easy since this initial amount D is not dependent on the pattern of the image, but is proportional to only the number of subblocks which are the fundamental units of processing, and since the header amount indicating the division state is also proportional to only the number of subblocks. Thus, the number of subblocks in this case can be determined according to the image size to be treated. Here, H is the header amount indicative of the divided state of one subblock, P is the fixed-length data amount when each of the division blocks constituting the subblock is quantized, and No is the total number (that is predetermined) of subblocks in one image. Then, the compressed data amount D at the highest compression (when the allowable distortion value Qp is the maximum) can be expressed by the following equation (1).

$$D=(H+P)No \quad (1)$$

Thereafter, when the allowable distortion value Qp is decreased step by step from the maximum value, the compressed data amount ΔD which is increased by the resulting new block development (division) is calculated and added to the initial amount D in turn. Thus, the compressed data amount corresponding to each allowable value is calculated in order.

The method of calculating the increasing compressed data amount ΔD will be mentioned below. The allowable distortion value is decreased by one. The memory 112 is caused to produce the number N (the maximum−1) of blocks having the distortion value of "maximum value−1", and that number is read in. These blocks cannot be used because the distortion value Q is larger than the allowable distortion value Qp. Thus, the block development is carried out, and each block is replaced by four small blocks which are one rank smaller. In other words, it is changed to the division state having four small blocks of which the distortion value is smaller than the allowable distortion value. As a result, the number of blocks used is increased by 3N in total. Then, if the distortion threshold calculator 114 specifies Qp, the increasing approximate data amount ΔD is 3N (Qp) P as expressed by the equation (3). The compressed data amount D (Qp) of the allowable distortion Qp is the addition of the equation (1) to the total sum of delta D, or to the sum of the gradually increased allowable distortion values from the maximum to Qp, as expressed by the following equation (2).

$$D(Qp) = D + \sum_{\max}^{Qp} \Delta D \quad (2)$$

$$\Delta D = 3 \cdot N(Qp) \cdot P \quad (3)$$

The distortion threshold value calculator 114 supplies Qp 114-4 to the memory 112, receives N (Qp) 114-3, calculates the ΔD expressed by the equation (3), and accumulates the calculated values. Thus, the relation between the allowable distortion value Qp and the compressed data amount D (Qp) can be obtained by the successive calculation operations. If Qp is the allowable distortion value at the time when the compressed data amount D (Qp) exceeds the specified amount Dt, the distortion threshold value Qthd is Qp−1. If the block division is performed by using the obtained distortion threshold value Qthd, or if blocks of as a large size as possible are used other than those satisfying the condition that Q is equal to or larger than Qthd, Q≧Qthd, the generated compressed data amount is the target value, or specified amount Dt.

In the conventional method disclosed in the Japanese Patent Laid-open Gazette No. 3-274919, the data (approximate data) approximately expressed in blocks has a fixed length, or is quantized to have a constant data length P, and thus the total amount of data after compression is selected to be the specified amount (specified data amount).

The picture quality upon decoding and the compression ratio have a reverse relationship. The quantization matched with the majority approximation coefficients of small values will increase the compression ratio. In other words, if the bit length assigned to the quantized data is decreased, a larger number of blocks can be approximately expressed by all the specified data amount, and hence a large number of blocks of small size can be used, thus leading to a higher spatial resolution.

However, normally the width of the approximate data after quantization is determined not by the maximum bit but by clipping. Thus, if large approximate coefficient data is expressed as above, the coefficient size cannot be completely expressed. The quantized results of the rarely occurring coefficients and the relatively frequently occurring intermediate coefficients are compressed as the same value. Consequently, upon decoding the brightness of the rapidly changed luminance, part of the original image cannot be correctly reproduced resulting in the picture quality of the decoded image being deteriorated.

When the bit length to be assigned to the quantized data is set to be reversely long, the larger coefficients can also be satisfactorily expressed so that the brightness of image part, including the rapid luminance change, can be reproduced, but the number of blocks which can be expressed in all the specified data amount is limited. In other words, many blocks of small size cannot be used, and thus the spatial resolution becomes low, so that the picture quality is deteriorated in a different way.

Therefore, since the conventional method disclosed in the Japanese Patent Laid-open Gazette No. 3-274919 is the compression coding system for realizing the process in which the total data amount after compression is made equal to the specified amount by quantizing the approximate coefficient data of individual block units in a fixed length, the picture quality deterioration cannot be avoided. In other words, in the conventional method, since the block approximation coefficient data are quantized to always have constant data length P, the performance of the compressing decoding is limited. That is, the picture quality at the time of decoding has a deep relationship with the quantization characteristic and a contrary relationship with the compression coefficient. Thus, the blocks which need the rarely occurring approximation coefficients of 16 bits or above cannot be completely expressed, causing the picture quality deterioration. In order to prevent this picture deterioration, the bit length after quantization must necessarily be increased from 16 bits to 24 bits or other values. In this case, however, the reduction of data amount in quantization is inadequate, thus reducing the compression ratio.

SUMMARY OF THE INVENTION

Accordingly, it is an object of the invention to provide a data coding method and apparatus capable of both reducing the deterioration of coded data and controlling the data amount.

It is another object of the invention to provide a data coding method and apparatus capable of preventing the input data supply from being interrupted and the coded data from being intermittently generated.

According to one aspect of the invention, in order to achieve the above objects, there is provided a data coding method for obtaining coded data by dividing input data into a plurality of blocks of different lengths (hereinafter named the division blocks), including a step for dividing the input data into different-length blocks in accordance with a distortion value indicative of an error between the input data and approximate data based on the input data, a step for obtaining variable-length quantized data by quantizing the approximate data associated with the input data of each of the blocks, a step for obtaining status data indicative of the state in which the input data is divided into the blocks, and a step for obtaining the coded data by combining the quantized data and the status data, wherein the step for dividing the input data into the different-length blocks includes a further step for processing so that the amount of the coded data is substantially coincident with a specified data amount.

According to this data coding method, since the quantized data has a variable length, the decoded data resulting from decoding the coded data is less deteriorated than in the conventional data coding method. In addition, the amount of the coded data can be controlled to be a specified data amount though the quantized data has a variable length.

The input data may be image data or other data.

According to another aspect of the invention, there is provided a data coding method and apparatus for obtaining coded data by processing input data in a certain block unit.

In this method and apparatus, the input data of each of all division blocks which can appear within the first-mentioned block on the basis of a predetermined hierarchical division block structure is converted into approximate data. A distortion value is obtained as the error between the decoded data to be obtained by decoding the approximate data associated with each of the division blocks and the input data in each division block associated with the decoded data. Additional amount information is obtained in each of the division blocks. The additional amount information indicates the amount of additional quantized data. The variable-length quantized data is formed of the additional quantized data associated with the approximate data and the fixed length reference quantized data associated with the approximate data. Increment/decrement information which is associated with each of the division blocks is obtained on the basis of the additional amount information. That is, increment/decrement information is expressed by Es–El. El indicates the amount of additional quantized data indicated by each of the additional amount information associated with the division block. Es indicates the amounts of additional quantized data indicated by the additional amount information which is associated with the less-significant division block of the division blocks. Histogram information is obtained on the basis of the distortion value and the increment/decrement information and indicates the number of the division blocks of each hierarchical structure level of the block as parameters of the distortion value and the increment/decrement information. A distortion threshold value is obtained on the basis of this histogram information. Division pattern information is obtained for discriminating selected one or more division blocks of all of the division blocks. The selected one or more division blocks satisfy the first condition of being associated with the distortion values less than the distortion threshold value, the second condition of covering the block without overlap, and the third condition of being as significant as possible. The approximate data associated with each of the selected one or more division blocks is converted into variable-length quantized data of the amount related to the approximate data on the basis of the division pattern information. Header data indicating which one of all division blocks is associated with each of the variable-length quantized data is generated on the basis of the division pattern information. The coded data is obtained by combining the variable-length quantized data and the header data. The distortion threshold value is selected so that the amount of coded data is substantially coincident with a specified data amount.

According to this data coding method and apparatus, since the quantized data has a variable length, the decoded data resulting from decoding the coded data is less deteriorated than in the conventional data coding method. The amount of the coded data can be controlled to be the specified data amount though the quantized data has a variable length.

When the coded data is obtained, it is possible to store the reference quantized data included in the variable-length quantized data into the first buffer memory means, the additional quantized data included in the variable-length quantized data into the second buffer memory means, and the header data in the third buffer memory means. In addition, it is possible to combine the reference quantized data stored in the first buffer memory means, the additional quantized data stored in the second buffer memory means and the header data stored in the third buffer memory means.

In this case, it can be prevented that the input data is interrupted, and that the coded data is intermittently generated.

The input data may be image data or other data.

DESCRIPTION OF THE PREFERRED EMBODIMENTS

A data coding method and apparatus of the invention will be described with reference to the accompanying drawings.

Figure 1:
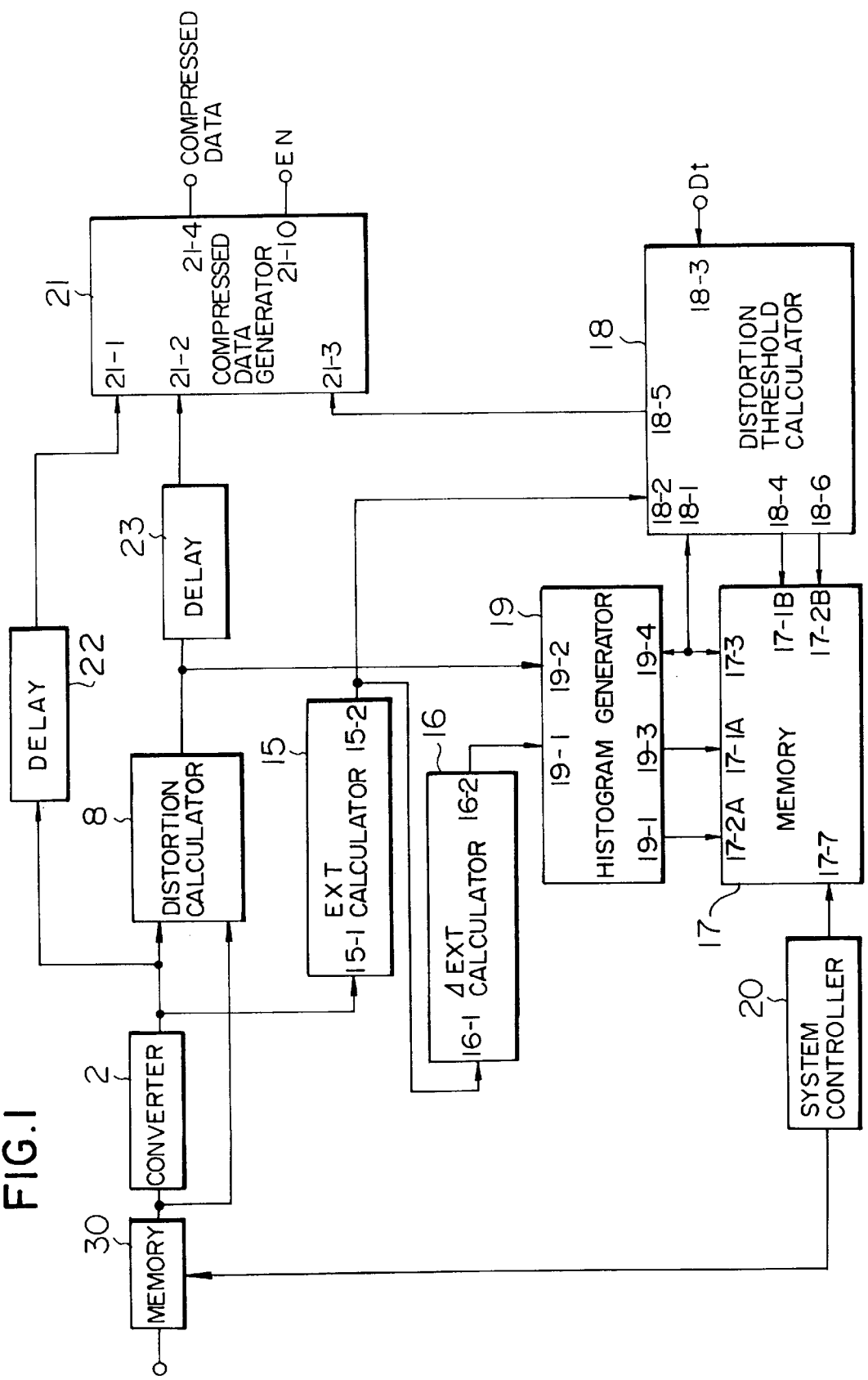
FIG. 1 is a block diagram of the whole construction of a data coding apparatus of one embodiment of the invention.

FIG. 1 is a block diagram of the whole construction of the data coding apparatus of one embodiment of the invention. Referring to FIG. 1, input data 1 is supplied through a buffer memory 30 to the input terminal of a converter 2 and to the original data input terminal of a distortion calculator 8. The memory 30 is controlled by a system controller 20. The output terminal of the converter 2 is connected to the converted data input terminal of the distortion calculator 8, to the terminal, 15-1 of an EXT calculator 15 and to the input terminal of a delaying device 22. The output, 15-2 of the EXT calculator 15 is connected to the terminal, 18-2 of a distortion threshold calculator 18 and to the terminal, 16-1 of a ΔEXT calculator 16. The output terminal, 16-2 of the ΔEXT calculator 16 is connected to the input terminal, 19-1 of a histogram generator 19. The distortion input terminal, 19-2 of the histogram generator 19 is connected to the output terminal of the distortion calculator 8, and the output terminal of the distortion calculator 8 is connected to the input terminal of a delaying device 23. The terminal, 19-3 of the histogram generator 19 is connected to the terminal, 17-1A of a memory 17, the terminal, 19-4 of the histogram generator 19 is connected to the terminal 17-3 of the memory 17, and the terminal, 19-10 of the histogram generator 19 is connected to the terminal, 17-2A of the memory 17. The terminal, 17-7 of the memory 17 is connected to the system controller 20. The terminals, 17-1B and 17-2B of the memory 17 are connected to the terminals, 18-4 and 18-6 of the distortion threshold calculator 18, respectively. The terminal, 18-1 of the distortion threshold calculator 18 is connected to the terminal, 17-3 of the memory 17. The output terminal of the delaying device 22, the output terminal of the delaying device 23 and the terminal, 18-5 of the distortion threshold calculator 18 are connected to the terminals, 21-1, 21-2, 21-3 of a compressed data generator 21, respectively. The compressed data generator 21 produces compressed data (coded data) from the terminal, 21-4. Also, the compressed data generator 21 produces from the terminal, 21-10 an EN signal which indicates whether the signal from the terminal 21-4 is effective or not as compressed data. The delaying devices 22 and 23 are used to adjust the timing relations of the input signals to the terminals 21-1, 21-2 and 21-3 of the compressed data generator 21 to coincide with each other.

The operation of the data coding apparatus of FIG. 1 will be briefly described below.

Figure 3A:
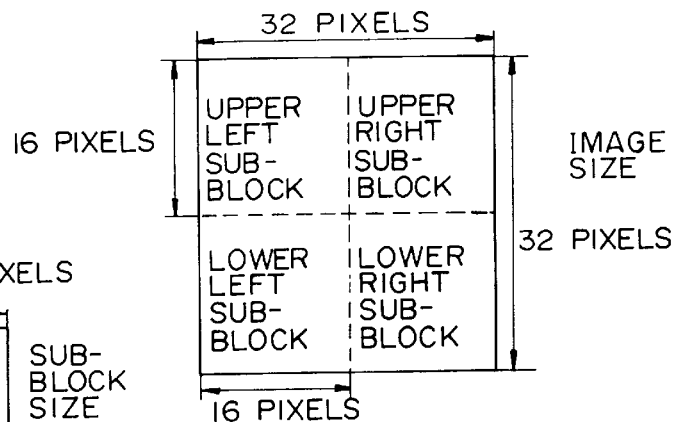
FIG. 3A shows an example of the input data.
Figure 3B:
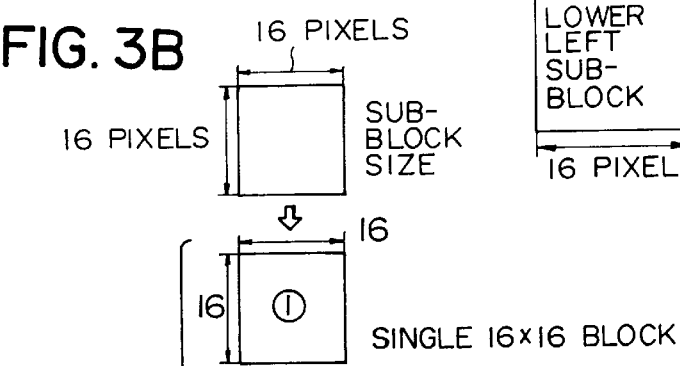
FIG. 3B shows an example of the subblock.
Figure 3C:
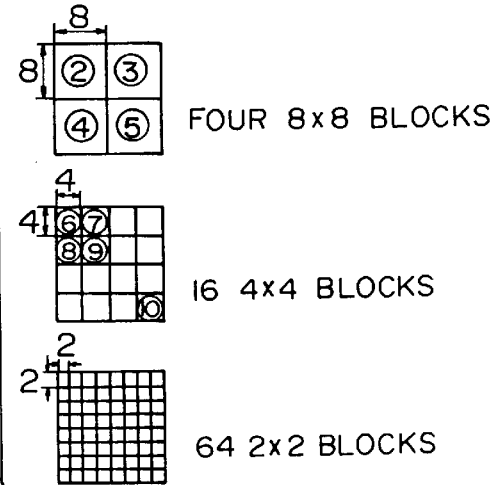
FIG. 3C shows an example of the hierarchical division block structure.
Figure 3D:
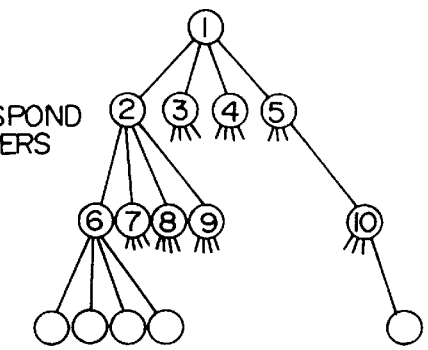
FIG. 3D shows the quad-tree of the hierarchical division block structure.

For convenience of explanation, it is assumed that, as shown in FIG. 3A, the input data 1 is image data the size of which is shown by 32 (horizontal)×32 (vertical) pixels, for example. In addition, it is assumed that the image data is divided into four subblocks, for example, and the each size of the subblock is 16 (horizontal)×16 (vertical) pixels as shown in FIG. 3B. Furthermore, the subblock described above can be shown by four different types of division blocks in a hierarchical division block structure as shown in FIGS. 3C(a) to FIG. 3C(d), that is, 16×16 pixels×1 block (called first division block), 8×8 pixels×4 blocks (called second division block), 4×4 pixels×16 blocks (called third division block) and 2×2 pixels×64 blocks (called fourth division block), respectively. This hierarchical division block structure can also be expressed by a quad-tree as shown in FIG. 3D. In FIG. 3D, the numbered nodes correspond to the division blocks attached with the same numerals in FIG. 3C. This invention is not limited to these assumptions.

The operation of the data coding apparatus of FIG. 1 under the above assumptions will be described in brief.

The input data 1, after once buffered in the memory 30, is converted into approximate data by the converter 2. In other words, the input data 1 in accordance with the subblock size in FIG. 3B is divided by the respective division blocks shown in FIG. 3C(a) to FIG. 3C(d), and then the input data 1 in accordance with the respective divided blocks of first, second, third and fourth division blocks is converted into approximate data, that is, the input data in accordance with each of the 4 blocks in the second division block, is converted into approximate data, as well as in the first, third and fourth division block. This conversion is performed by, for example, approximating each division block by a bilinear function shown by the following equation (4) and determining approximate data from the coefficients (A, B, C, and D) of the equation.

$$f(i,j) = A \cdot i + B \cdot i + C \cdot j + D \qquad (4)$$

where i, j indicates the position within the block, f(i,j) is the value of the bilinear function at the position (i,j) within the block, and A, B, C and D are coefficients.

The distortion calculator 8 produces a distortion value Q indicative of the error, or difference between decoded data to be obtained by decoding the approximate data corresponding to each of the division blocks, and the input data within the division block corresponding to the decoded data. The distortion value associated with the less-significant division block has the tendency to be smaller than that with the more-significant division block, wherein the less-significant division block means a division block which a number of the divided blocks is large such as FIG. 3C(c) and 3C(d), and the more-significant division block means a division block which a number of divided blocks is small such as FIG. 3C(a) and 3C(b), for example.

In the above mentioned embodiment, the image data corresponding to the respective divided blocks of the respective division blocks, for example, each of 4 blocks shown in FIG. 3C(b) is converted with 4 bytes, for example, into the quantized data. However, there is the image data of each block which cannot be converted with 4 bytes into the quantized data when the image in each block is complex, for example. In this case, the additional bytes are needed to convert the image data of each block into the quantized data, which is called the additional quantized data EXT. Therefore, the image data corresponding to the respective divided blocks of the first to fourth division blocks is converted into the quantized data which is shown by ND+EXT called a variable-length quantized data, wherein ND means a reference quantized data such as a data being able to quantize within 4 bytes.

The EXT calculator 15 produces the additional quantized data described above.

The ΔEXT calculator 16 produces increment/decrement information ΔEXT. The increment/decrement information ΔEXT indicates a value expressed by Es−El. El indicates the additional quantized data EXT in the case where the image data corresponding to the block in the predetermined division block such as the second division block is converted into a quantized data. Es indicates the additional quantized data EXT in the case where the image data corresponding to the block in the less significant division block such as the third division block is converted into a quantized data.

The increment/decrement information ΔEXT will be given more detail using the first division block shown in FIG. 3C(a) and the second division block shown in FIG. 3C(b). In this case, the quantized data (ND+EXT) in the first division block is indicated by P bytes in the reference quantized data ND and m bytes in the additional quantized data EXT, that is, by the formula (P+m). The quantized data (ND+EXT) in the second division block is indicated by 4 P bytes in the reference quantized data ND and n bytes in the additional quantized data EXT, that is, by the formula (4P+n). As a result, the difference between the second division block and the first division block is (3P+n−m) bytes.

In this embodiment, the approximate data includes four different pieces of information (corresponding to the coefficients B, C, A, D in the equation (4)) associated with H-direction, V-direction, HV-direction and DC level. The EXT is expressed by the addition of 1 byte to necessary information of the four different pieces of information. Thus, since m is four bytes maximum, n is 16 bytes maximum, and n−m is in the range from 16 to −4. In other words, when the image data is divided by the division block, the number of divided block of which is larger, the quantized data is fundamentally increased by 3P bytes in the reference quantized data ND and the data in the range from 16 to −4 (the negative value indicates decrease) is increased in the additional quantized data EXT. The information ΔEXT associated with each divided block of the respective division block is formulated by (n−m).

Figure 2A:
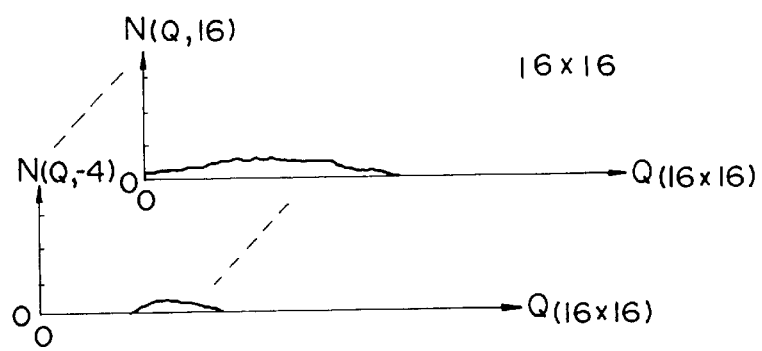
FIGS. 2A through 2C are graphs conceptually showing examples of histogram information.
Figure 2B:
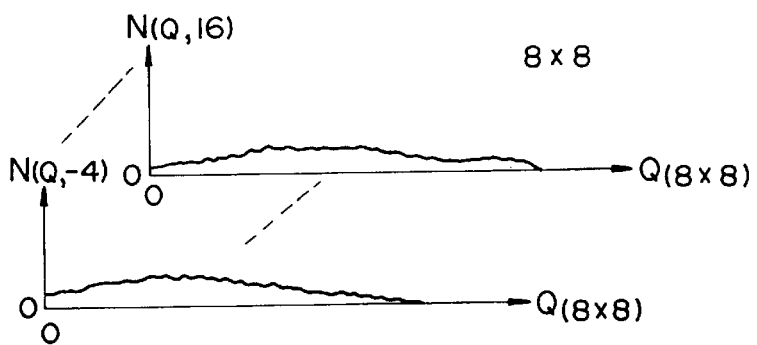
Figure 2C:
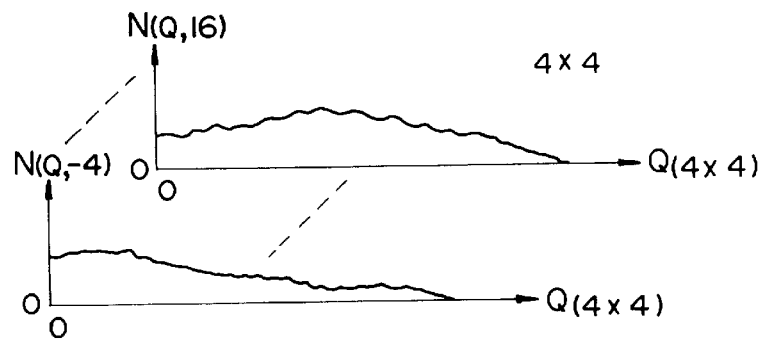

The histogram generator 19 generates histogram information on the basis of the distortion value Q and the increment/decrement information ΔEXT. The histogram information indicates the number N(Q, ΔEXT) of the divided blocks of respective division blocks such as the first to fourth division blocks within one image as parameters of the distortion value Q and the increment/decrement information ΔEXT. The histogram information is stored in the memory 17. FIGS. 2A through 2C conceptually show examples of the histogram information. Each graph in FIG. 2A shows the histogram information concerning each divided block in the first division block, and the number of graphs is equal to the number (21 in an example shown in FIG. 2A) of the ΔEXT. FIG. 2B shows the histogram information concerning the each divided block in the second division block, and FIG. 2C shows the histogram information concerning the each divided block in the third division. The histogram information concerning the each divided block in the fourth division block is not present because the less-significant division block than the fourth division block is assumed not to appear.

The generation of the histogram information will be described in brief. The memory 17 is initialized before the image of interest is processed, and the contents of the memory 17 are taken out which are associated with the Q and ΔEXT produced from the distortion calculator 8 and ΔEXT calculator 16. The taken-out information are added with +1 and again stored in the memory 17 at the locations associated with the Q and ΔEXT. This processing is performed for all division blocks of the image of interest so as to produce the histogram information of the image of interest. In this case, for example, Q can be assigned to a more-significant address, and ΔEXT to a less significant address.

The distortion threshold calculator 18 produces a distortion threshold value Qthd on the basis of the histogram information. The distortion threshold value is selected so that the amount of coded data substantially coincides with the specified data amount (specified amount) Dt.

One specific example of the method for producing the distortion threshold value will be briefly described below.

The distortion threshold calculator 18 first determines the initial amount D of compressed data in order to produce the distortion threshold value for the division of specified amount Dt. If the reference quantized data amount is expressed by P bytes and the header of the information indicative of the state of the block division is expressed by H bytes, the value of (H+P) is not dependent on the pattern of the image and is proportional to the number of subblocks which are fundamental processing units. Thus, the value of (H+P) No which is determined by the total number No (4 in FIG. 3A) of predetermined subblocks is necessary independently of the pattern of the image. Moreover, since the additional quantized data EXT is dependent on the pattern of the image, the distortion threshold calculator 18 determines the number of EXT of the division block (the most significant division block, or a division block of 16×16 pixels size in FIGS. 3A through 3D) of the maximum size necessary for approximating the block of each image, and adds the sum result to the initial amount D.

Since the distortion value Q in this embodiment is 0 through 255, Qp is larger than Q at Qp=256, and thus no development of block is necessary.

Accordingly, the initial amount can be found from the following equation (5).

$$D(256)=(H+P) \text{ No}=\Sigma \text{EXT (only the maximum block)} \quad (5)$$

where ΣEXT (only the maximum division block) is the total number of EXT of the maximum-size division block.

Then, the data amount D (255) at the allowable distortion value Qp=255 is determined. In other words, since Q is larger than Qp, the number of blocks with Q=255 to be developed is determined. The memory 17 produces at the terminal 17-3 the block number N (255, 16) ranked (associated with) as Qp=255, ΔEXT=16, block number N (255, 15) ranked as Qp=255, ΔEXT=15, . . . the block number N (255, −4) ranked as Qp=255, ΔEXT=−4.

The sum or ΣN(255, ΔEXT) of these output values N (255, 16), N (255, 15) . . . N (255, −4) is a fundamental data increment which is caused when the allowable distortion value Qp is changed from 256 to 255, and is the second term of the equation (16).

In addition, the irregular data increment depending on the pattern is the sum of the values of respective N (255, ΔEXT) multiplied by ΔEXT, or the sum of N (255, 16) * 16, N (255, 15) * 15, . . . N (255, −4) * −4, and corresponds to the third term of the equation (6). Therefore, when the allowable distortion value Qp is equal to 255, the data amount D (255) can be expressed by the following equation 6).

$$D(255)=D(256)+3*P*\Sigma N(255, \Delta \text{EXT})+ \Sigma N(255, \Delta \text{EXT})*\Delta \text{EXT} \quad (6)$$

Thereafter, the allowable distortion Qp is decreased one by one, and D (Qp) is determined on the basis of the total number of division blocks which is increased by block division. This embodiment first finds the block number N (Qp, ΔEXT) including the block numbers N associated with 21 different EXT values (16 through −4) and with the same distortion value Q, that is, N (Q, 16), N (Q, 15), . . . , N (Q, −4).

The fundamental increment is the sum of these 21 different N (Qp, ΔEXT) multiplied by 3*P, and corresponds to the second term of the equation (7). The irregular increment is the sum of N (Qp, ΔEXT) values multiplied by ΔEXT, or 21 different N (Qp, ΔEXT)·ΔEXT, and corresponds to the third term of the equation (7).

The new increments thus obtained are added to the first term of the equation (7), or the total data amount at the previously obtained allowable distortion value, so that the total data amount at a new allowable distortion value can be calculated.

$$D(Qp)=D(Qp+1)+3*P*\Sigma N(Qp, \Delta \text{EXT})+\Sigma N(Qp, \Delta \text{EXT})*\Delta \text{EXT} \quad (7)$$

As described above, the distortion threshold calculator 18 sequentially produces compressed data amounts with the allowable distortion values Qp set at each value in the range from 255 to 0. The value Qp which first satisfies the condition of D (Qp)>Dt is the distortion threshold value Qthd for the specified amount Dt. The distortion threshold value calculator 18 calculates and produces the distortion threshold value Qthd for the specified data amount Dt at each image according to the above method.

While in the above method the distortion threshold value Qthd is obtained by calculating on the basis of the histogram information the data increment when the allowable distortion value Qp is decreased from the state (the minimum coded data amount) in which the maximum-size block is used, the allowable distortion value Qp may be obtained by calculating on the basis of the histogram information the data decrement when the allowable distortion value Qp is increased from the state (the maximum coded data amount) in which the minimum-size blocks (the least-significant division blocks, or division blocks of 2×2 pixels size in FIGS. 2A through 3D) are used.

The compressed data generator 21 produces division pattern information for discriminating one or more division blocks selected from all of the division blocks. The selected one or more division blocks satisfy the first condition that they be associated with the distortion values Q not more than the distortion threshold value Qthd, the second condition that they cover one image without any overlap, and the third condition that they are divided to be as large as possible.

Also, the compressed data generator 21 converts the approximate data corresponding to each of the selected one or more division blocks of all of the division blocks into variable-length quantized data of the amount associated with the approximate data on the basis of the division pattern information.

Moreover, the compressed data generator 21 generates header data for indicating the association of each piece of the variable-length quantized data with one of the division blocks on the basis of the division pattern information. This header indicates the state in which the image is divided into blocks.

In addition, the compressed data generator 21 produces the coded data by coupling the variable-length quantized data and the header data.

In the data coding apparatus shown in FIG. 1, as described above, the number of additional data EXT caused by the individual division blocks of variable lengths is compared with the number of EXT of less significant division blocks caused by the development of those division blocks, and the increment or decrement therebetween is treated as ΔEXT information and permitted to be associated with the individual division blocks. The ΔEXT and the distortion value Q are used as parameters to produce histogram information.

The second term of the equation (7) is eventually the same as the second term of the equation (2) of the prior art. In this apparatus, however, the equation (7) includes the third term. In other words, although the variable-length quantized data is employed, the increment and decrement of the irregular additional data amount involved in the block development can be calculated on the basis of the histogram information, and thus the compressed data amount in the block division according to each allowable distortion value Qp can be obtained with high accuracy.

Therefore, in the data coding apparatus of this invention, the distortion threshold value Qthd, that is, the erroneous state within which the externally specified amount is kept, can be obtained even for the variable length code. The different-length block division coding is performed according to this value Qthd so that input data can be compressed and coded so as to have a specified data amount and to improve the compression decoding characteristic even if the input data has more data than the predetermined data amount.

Figure 4:
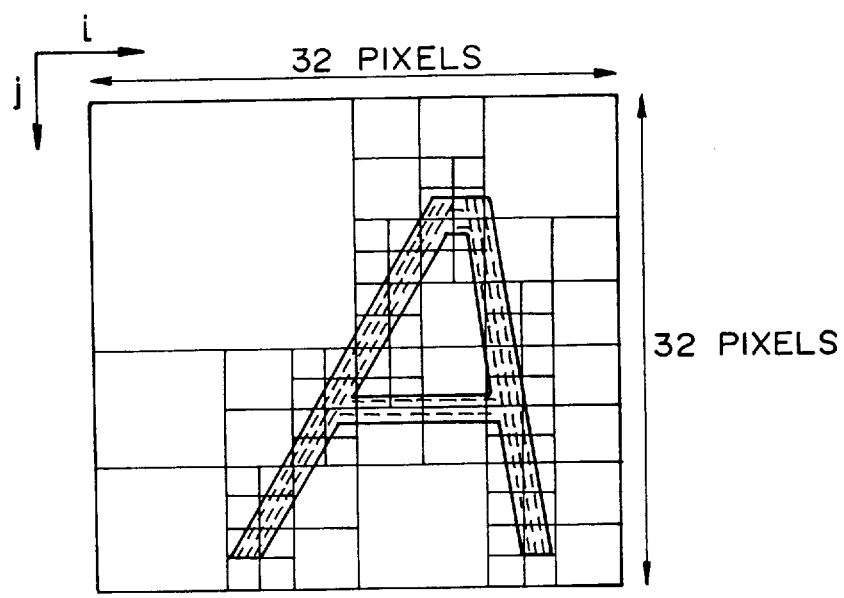
FIG. 4 shows the relation between the input data and the division block.

FIG. 4 shows an example of the divided state of an image "A" of input data 1 according to the data coding apparatus of FIG. 1. As apparently shown in FIG. 4, the image data 1 of the image size shown in FIG. 3A is divided by the different types of the division blocks shown in FIG. 3C(a) to FIG. 3C(d) according to the complicated state of the image.

A specific example of the data coding apparatus of FIG. 1 will be described with reference to FIGS. 5 through 12L.

Figure 5:
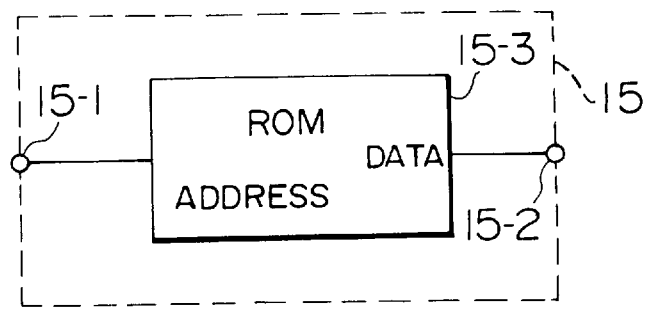
FIG. 5 is a block diagram of one example of the construction of the EXT calculator shown in FIG. 1.

FIGS. 5 shows one example of the construction or the EXT calculator 15 of FIG. 1. The input terminal is connected to the address input end of a ROM 15-3, and the data output end of the ROM 15-3 is connected to the terminal, 15-2. The ROM 15-3 has previously written therein the address associated with the approximate data (the approximate coefficients (A, B, C, D)) and the presence or absence of EXT which indicates the amount of additional quantized data EXT included in the variable-length quantized data that is to be changed by quantizing the approximate data. This is commonly known as the ROM table, and thus the operation will not be described. When the additional quantized data EXT is not fixed but variable in length, the amount of EXT, not the presence or absence of EXT, is previously written in the ROM 15-3.

Figure 6:
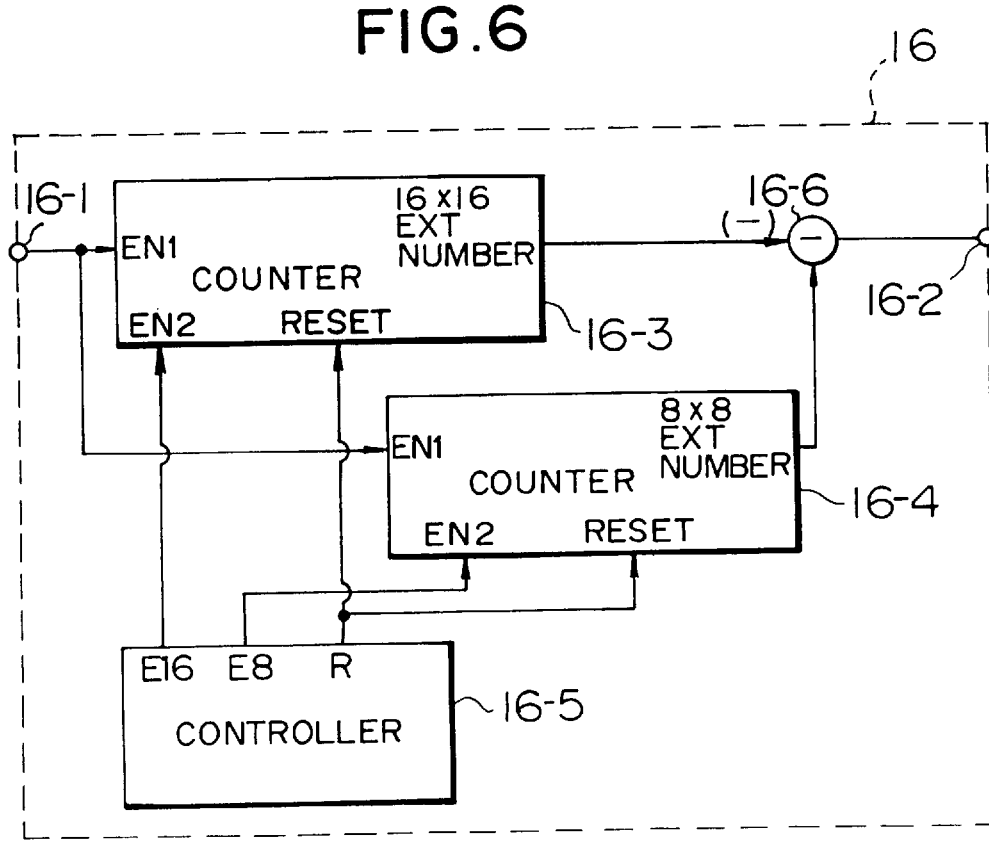
FIG. 6 is a block diagram of one example of the construction of the ΔEXT calculator shown in FIG. 1.

FIG. 6 shows one example of the construction of the ΔEXT calculator 16 of FIG. 1. The terminal, 16-1 is connected to the EN1 terminal of an EXT counter 16-3 for the division block of 16×16 pixels size, and to the EN1 terminal of an EXT counter for division blocks of 8×8 pixels size. The EN2 terminal of the EXT counter 16-3 and the EN2 terminal of the EXT counter 16-4 are connected to the control pulse E16, E8 terminals of a controller 16-5, respectively. The reset terminals of the counters 16-3 and 16-4 are connected to the control pulse R terminal of the controller 16-5. The counter output of the counter 16-3 is connected to the input terminal (−) of a subtracter 16-6, and the counter output from the counter 16-4 to the input terminal (+) of the subtracter 16-6. The output of the subtracter 16-6 is connected to the terminal, 16-2. The controller 16-5, and the counters 16-3, 16-4 are supplied with a system clock.

The operation of the ΔEXT calculator 16 shown in FIG. 6 will be described below. The counters 16-3, 16-4 operate to count when supplied at their terminals EN1 and EN2 with logic 1, and return their counts to 0 when supplied at their reset terminals with logic 1. The controller 16-5 controls the counters 16-3, 16-4 to be reset and initialized before being supplied with the EXT presence or absence information of fundamental blocks from the input terminal 16-1.

Then, the control pulse E16 is made logic 1 only when the 16×16 EXT presence or absence information of fundamental blocks (for example, one image) is supplied to the counters. The control pulse E8 is made logic 1 only when the 8×8 EXT presence or absence information is supplied to the counters. Thus, at each fundamental block unit, the counter 16-3 counts the EXT number of 16×16 size block, and the counter 16-4 counts the EXT number of 8×8 size block.

The subtracter 16-6 finally produces the ΔEXT number which is the difference between the "EXT number of 8×8 size block" and "EXT number of 16×16 size block". Then, the counters 16-3, 16-4 are supplied at the reset terminals with logic 1 from the controller 16-5, so that they are initialized.

In the ΔEXT calculator 16 of FIG. 6, for convenience of explanation, the hierarchical division block structure is assumed to be formed of two levels of 16×16, 8×8. However, it is obvious that the modification of FIG. 6 can be made according to such hierarchical division block structure as for example shown in FIGS. 3A through 3D.

Figure 7:
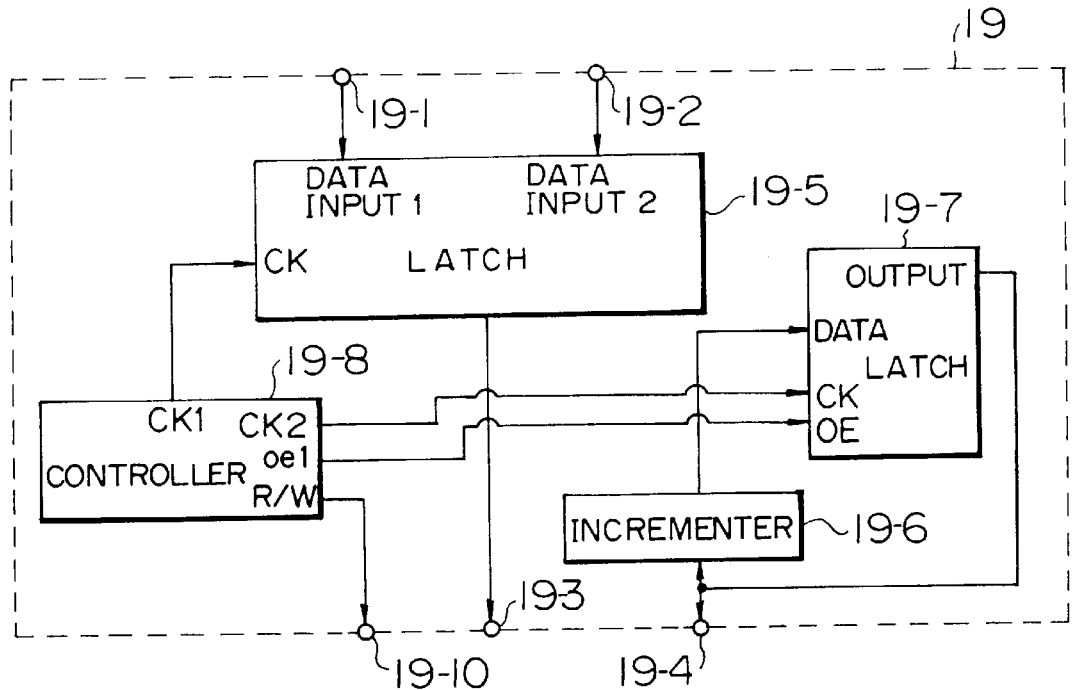
FIG. 7 is a block diagram of one example of the construction of the histogram generator shown in FIG. 1.

FIG. 7 shows an example of the construction of the histogram generator 19 of FIG. 1. The terminals, 19-1, 19-2 are connected to the data input terminals of a latch 19-5. The output terminal of the latch 19-5 is connected to the terminal, 19-3. The CK terminal of the latch 19-5 is connected to the pulse CK1 terminal of a controller 19-8. The terminal, 19-4 is connected to the input terminal of an incrementer 19-6, and the output terminal of the incrementer 19-6 is connected to the data input terminal of a latch 19-7. The output terminal of the latch 19-7 is connected to the terminal 19-4. The CK terminal and OE terminal of the latch 19-7 are connected to the pulse CK2 terminal and pulse oel terminal of the controller 19-8. The R/W control signal terminal of the controller 19-8 is connected to the terminal, 19-10.

The operation of the histogram generator 19 shown in FIG. 7 will be described below. The ΔEXT is supplied to the terminal 19-1, and the distortion value Q to the terminal 19-2. The controller 19-8 generates a pulse ck1 and supplies it to the latch 19-5, controlling the ΔEXT at the terminal 19-1 and the distortion value Q at the terminal 19-2 to be stored in the latch 19-5. The latched ΔEXT and distortion value Q are supplied from the terminal 19-3 to the memory 17. At the same time, the controller 19-8 supplies the R/W control signal as a read signal to the memory 17, controlling it to produce the number N (Q, ΔEXT) of the corresponding ΔEXT and distortion value Q. The read information is received through the terminal 19-4 to the incrementer 19-6. The incrementer 19-6 adds +1 to this information, and supplies it to the latch 19-7 in which it is stored. In this case, the output of the latch 19-7 is disabled. The controller 19-8 controls the output of the latch 197 to be enabled, and also supplies the R/W control signal as a write signal to the memory 17, controlling it to newly store the +1 added number N (Q, ΔEXT). This operation is repeated for one image so that the histogram information can be generated within the memory 17.

Figure 8:
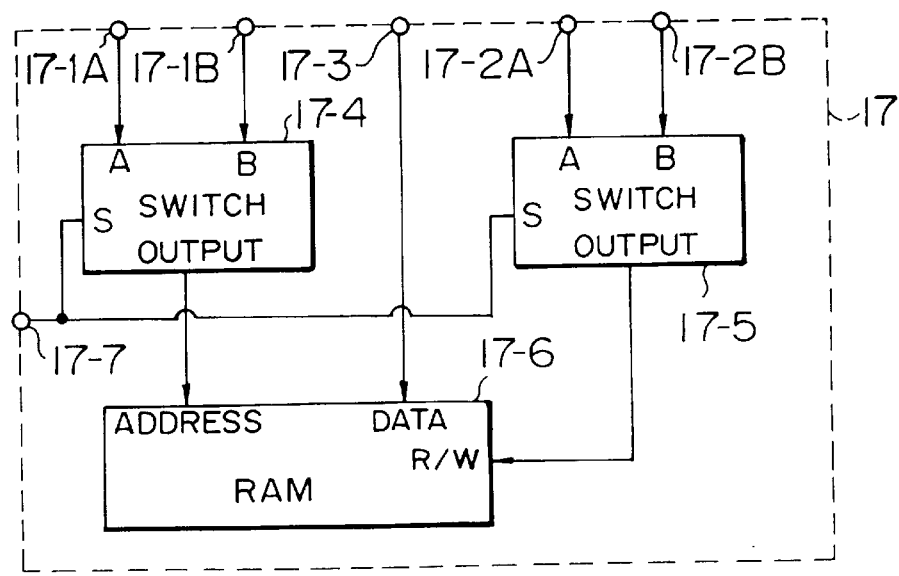
FIG. 8 is a block diagram of one example of the construction of the memory shown in FIG. 1.

FIG. 8 shows one example of the construction of the memory 17 of FIG. 1. The terminals, 17-1A and 17-1B are connected to the input A and input B of a switch 17-4, respectively. The terminals, 17-2A and 172B are connected to the input A and input B of a switch 17-5, respectively. The output terminals of the switches 17-4 and 17-5 are connected to the address terminal and control terminal of a RAM 17-6, respectively. The terminal, 17-3 is connected to the data terminal of the RAM 17-6. The switching terminals S of the switches 17-4 and 17-5 are connected to the 5 terminal, 17-7.

The operation of the memory 17 shown in FIG. 8 will be described below. When supplied with logic 1, 0 at the switching terminals S, the switches 17-4 and 17-5 select and supply the input A, B. In other words, the RAM 17-6 is controlled by the signal fed through the terminal 17-7 so as to be placed under the control of either the histogram generator 19 or the distortion threshold calculator 18.

Figure 9:
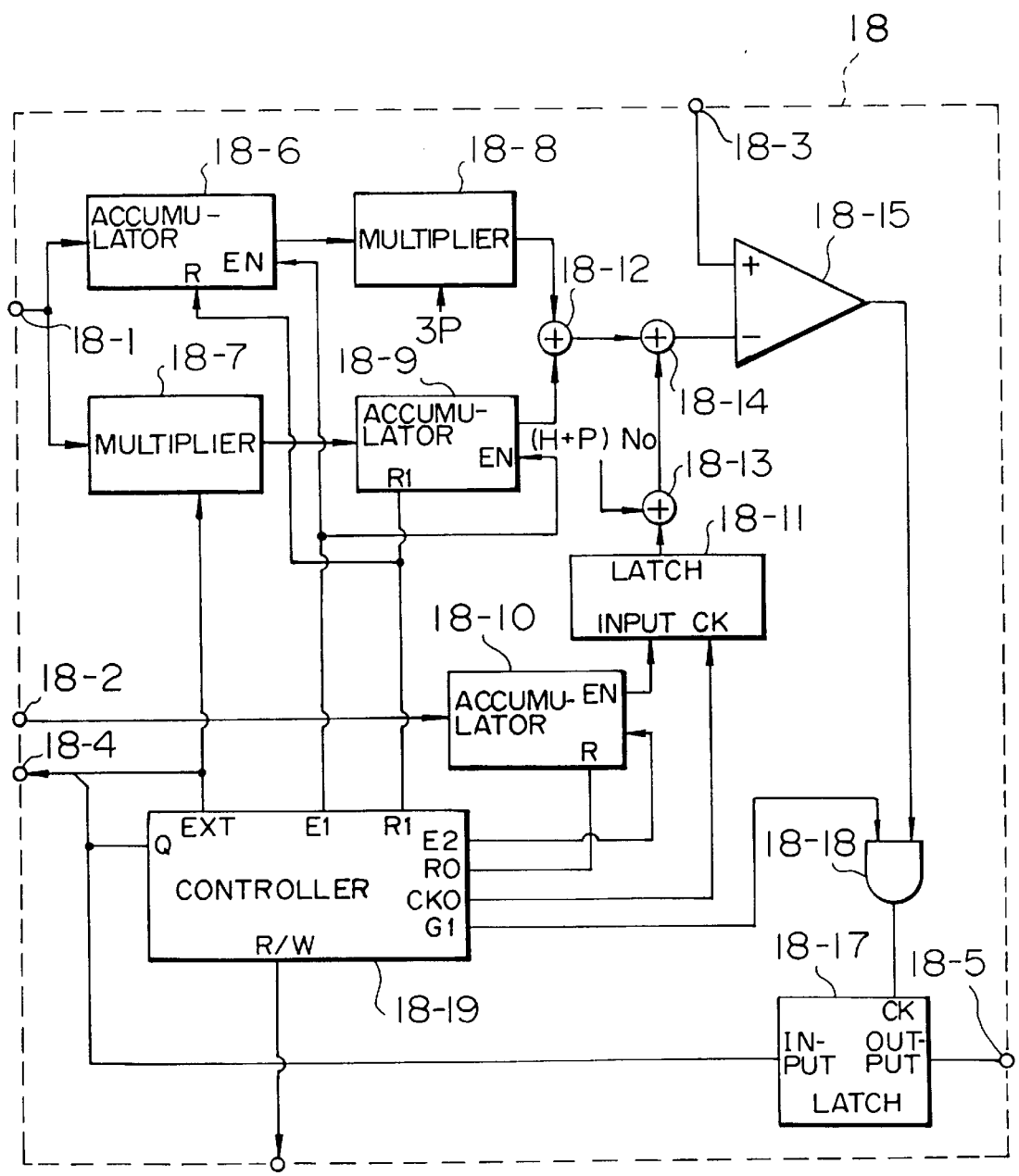
FIG. 9 is a block diagram of one example of the construction of the distortion threshold calculator shown in FIG. 1.

FIG. 9 shows one example of the construction of the distortion threshold calculator 18 of FIG. 1. The input terminal, 18-1 is connected to a multiplier 18-7 and to an accumulator 18-6. The input terminal, 18-2 is connected to an accumulator 18-10. The input terminal, 18-3 is connected to the +terminal of a comparator 18-15. The output terminal, 18-4 is connected to the Q terminal and ΔEXT terminal of a controller 18-19. The output terminal, 18-5 is connected to the data output terminal of a latch 18-17. The EN terminals of the accumulators 18-6 and 18-9 are connected to the E1 terminal of the controller 18-19. The output terminal of the accumulator 18-9 is connected to a multiplier 18-8, and 3*P is applied to the other input terminal of the multiplier 18-8. The output from the EXT terminal of the controller 18-19 is supplied to the other input terminal of the multiplier 18-7.

The output from the multiplier 18-7 is supplied to the input end of the accumulator 18-9. The R-terminals of the accumulators 18-6, 18-9 are connected to the R1-terminal of the controller 18-19. The R-terminal of the accumulator 18-10 is connected to the R0-terminal of the controller 18-19, and the EN-terminal of the accumulator 18-10 is connected to the E2-terminal of the controller 18-19. The output terminal of the accumulator 18-10 is connected to the data terminal of a latch 18-11. The data output terminal of the latch 18-11 is connected to an adder 18-13, and the clock terminal of the latch 1811 to the CKO-terminal of the controller 18-19. The (H+P) N is applied to the other input terminal of the adder 18-13. The outputs from the multipliers 18-8, 189 are supplied to an adder 18-12. The outputs from the adders 18-12, 18-13 are supplied to an adder 18-14. The output terminal of the adder 18-14 is connected to one terminal of a comparator 18-15. The output terminal of the comparator 18-15 is connected to the input terminal of an AND gate 18-18, and the Gl-terminal of the controller 18-19 is connected to the other input terminal of the AND gate. The output terminal of the AND gate 18-18 is connected to the CK-terminal of the latch 18-17. The latch 18-17 is supplied at the data terminal with a signal which is fed from the Q-terminal of the controller 18-19.

The operation of the distortion threshold calculator 18 shown in FIG. 9 will be described below. The controller 18-19 supplies logic 1 to the R-terminal of the accumulator 18-10, and after calculating ΣEXT (maximum length division blocks only), controls it to operate for the equation (5) namely D (256) by use of the adder 18-13 before the image data of interest is processed. The multipliers 18-17, 18-18 produce the multiplied results of two input signals. The accumulators 18-6, 18-9, 18-10 initialize the outputs when supplied at the R-terminals with logic 1. The accumulators accumulate the data applied at the EN terminals in synchronism with this logic 1.

The controller 18-19 produces 255 at the Q terminal and momentarily supplies logic 1 from the R1 terminal to the accumulators 18-6,9, resetting the contents thereof to 0. Also, it supplies +16, . . . , −4 from the ΔEXT terminal and at the same time the CK, so that the memory 17 produces N (255, 16), . . . , N (255, −4). The accumulator 18-6 and multiplier 18-8 operate to calculate the second term of the equation (6), and the multiplier 18-7 and accumulator 18-9 operate to calculate the third term of the equation (7). Then, when 254 is produced at the Q-terminal, the memory 17 produces N (254, 16), . . . , N (254, −4), and the equation (7) is calculated.

The value at the Q-terminal of the controller 18-19 is, as described above, decreased one by one from the maximum in turn. Just before this value is changed, the output at the Gl-terminal is momentarily changed to H-level. The comparator 18-15 compares the specified data amount Dt and the data amount D (Qp) at the allowable distortion value Qp. If Dt>D (Qp), the comparator produces H level and supplies it to the AND gate 18-18. The output at the Gl-terminal of the controller 18-19 is applied to the clock terminal of the latch 18-17, so that the value Qp-1 is stored in the latch 18-17.

However, when Dt becomes equal to or smaller than D (Qp), or Dt≦D(Qp) at the time of Qp=X, the comparator 18-15 produces low level L. Thus, the control output G1 from the controller 18-19 is not supplied to the latch 18-17 so that the output value is kept at X-1. As a result, the value held in the latch 18-17 is produced as the distortion threshold value Qt at the output terminal 18-5 of the distortion threshold calculator 18.

The distortion threshold calculator 18 calculates the equations (5) and (7), and it can be realized by use of a one-chip microcomputer or the like.

Figure 10:
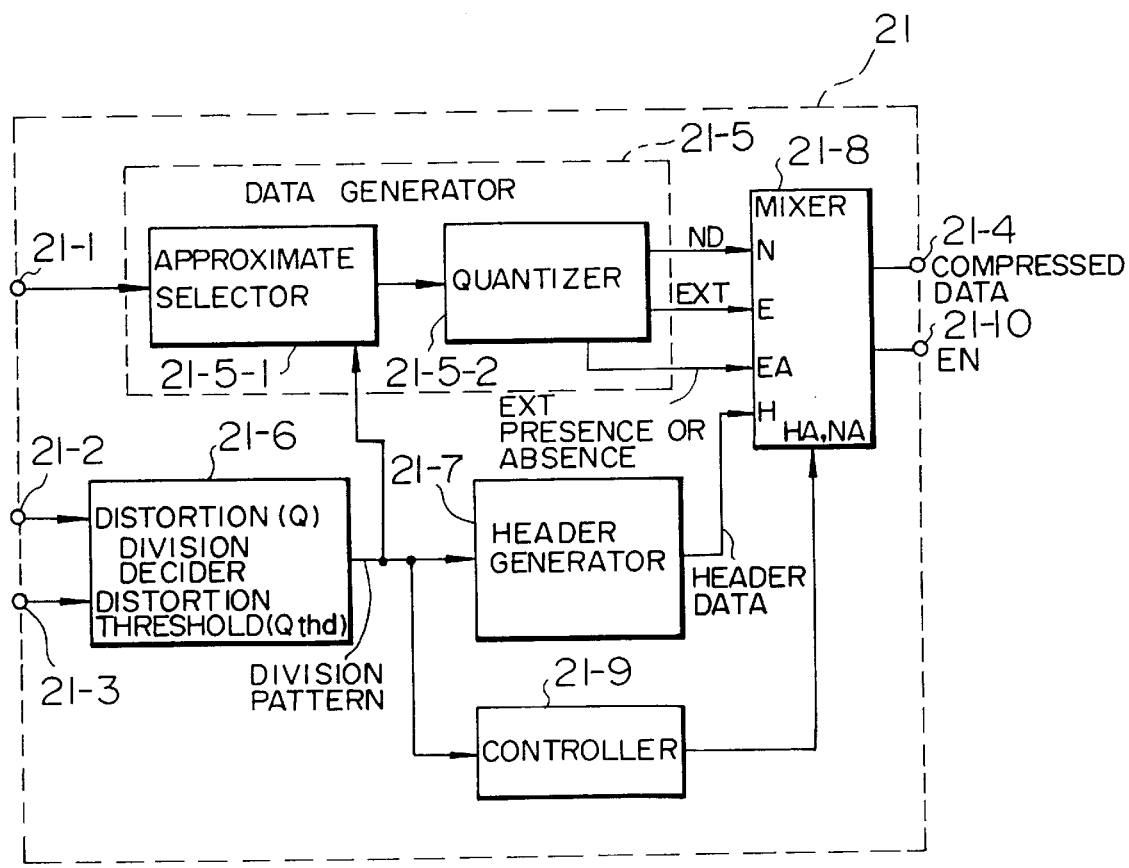
FIG. 10 is a block diagram of one example of the construction of the compressed data generator shown in FIG. 1.

FIG. 10 shows one example of the construction of the compressed data generator 21. The terminal, 21-1 is connected to the approximate data input terminal of an approximate coefficient selector 21-5-1. The output terminal of the approximate coefficient selector 21-5-1 is connected to the input terminal of a quantizer 21-5-2. The terminal, 21-2 is connected to the distortion input terminal of a division decider 21-6, and the terminal, 21-3 to the distortion threshold value input terminal of the division decider 21-6. The approximate coefficient selector 21-5-1 and the quantizer 21-5-2 constitute a data generator 21-5. The ND output terminal, EXT output terminal and EXT presence or absence output terminal of the quantizer 21-5-2 are connected to the terminals N, E, EA of a mixer 21-8, respectively. The output terminal of the division decider 21-6 is connected to the selection input terminal of the approximate coefficient selector 21-5-1, to the input terminal of a header generator 21-7 and to the input terminal of a controller 21-9. The header output terminal of the header generator 21-7 is connected to the terminal H of the mixer 21-8. The output terminal of the mixer 21-8 is connected to the terminals, 21-4 and 21-10. The output terminal of the controller 21-9 is connected to the input terminals HA, NA of the mixer 21-8.

The operation of the compressed data generator 21 shown in FIG. 10 will be described below. The approximate data of the input image is delayed by a processing time for the calculation of the distortion threshold value Qthd and fed from the delaying device 22 to the terminal 21-1. The distortion value of the approximate coefficient data of the input image is similarly delayed and supplied from the delaying device 23 to the terminal 21-2. First, the division decider 21-6 compares the distortion threshold value Qthd from the terminal 21-3 and the distortion value Q and supplies a division pattern signal to the approximate data input terminal of the approximate coefficient selector 21-5-1, to the input terminal of the header generator 21-7 and to the input terminal of the controller 21-9. All possible division block approximate data is sequentially supplied to the approximate data input terminal of the approximate coefficient selector 21-5-1. This selector selects necessary block approximation data from all division block approximation data in accordance with the input division pattern information fed to the selection input terminal, and supplies it to the quantizer 21-5-2. The quantizer 21-5-2 converts the selected approximation data into the variable-length quantized data. In other words, the quantizer 21-5-2 is responsive to the selected approximate data to produce only the reference quantized data ND or both the corresponding reference quantized data ND and the corresponding additional quantized data EXT. In addition, the quantizer 21-5-2 produces the signal indicative of the presence or absence of the output from the additional quantized data EXT. The quantizer 21-5-2 can be constructed by, for example, a ROM table. The header generator 21-7 also compresses the information indicative of the block division state in accordance with the division pattern information, and produces the head data.

The controller 21-9 supplies the mixing control signal to the terminal HA, NA of the mixer 21-8 5 in accordance with the division pattern information. The mixer 21-8 mixes the reference quantized data ND, the additional quantized data EXT and the header data in a time-sharing manner in accordance with the states of the terminals EA, HA, NA to produce compressed data (coded data) at the terminal 21-4. In addition, since the compressed data can be intermittently produced from the terminal 21-4, a signal indicating whether the signal produced from the terminal 21-4 is effective or not as compressed data is produced from the terminal 21-10.

Figure 11:
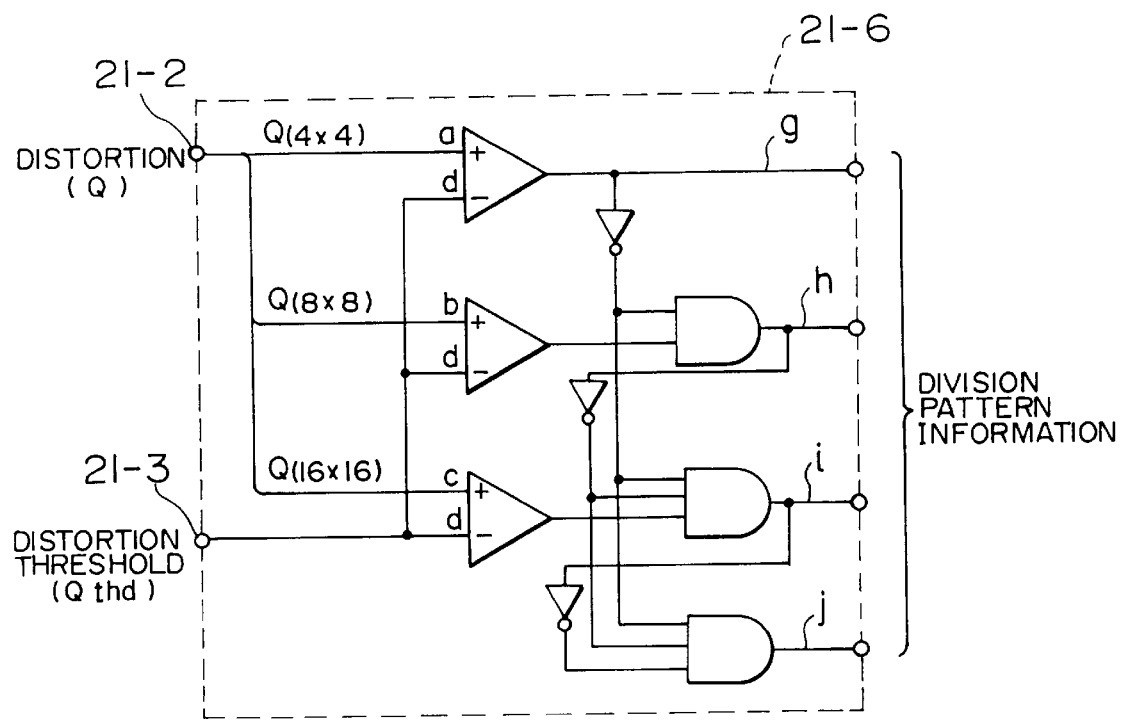
FIG. 11 is a block diagram of one example of the construction of the division decider shown in FIG. 10.
Figure 12:
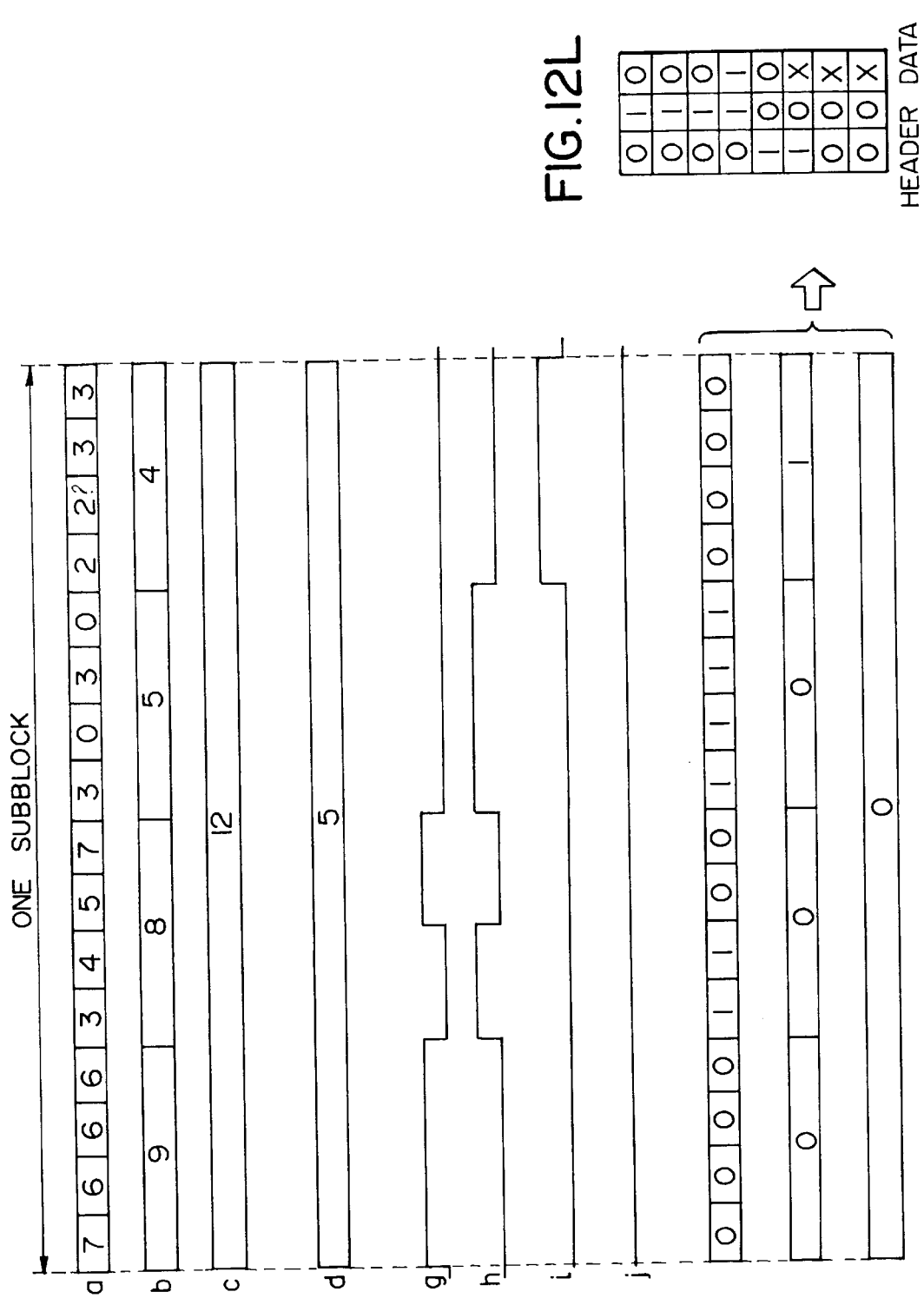
FIGS. 12A through 12H show examples of the signals in FIG. 11.
FIGS. 12I through 12K show examples of the signals obtained in the process for header data.
FIG. 12L shows one example of the header data.

FIG. 11 shows one example of the construction of the division decider 21-6 of FIG. 10. In this example, the division decider 21-6 is formed of three comparators, three NOT gates and three AND gates. The signals a, b and c in FIG. 11 correspond to the distortion value Q(4×4) for 4×4 pixels division block, distortion value Q(8×8) for 8×8 pixels division block and the distortion value Q(16×16) for 16×16 pixels division block, respectively. The signal d in FIG. 11 indicates a distortion value 21-3. When the signals a, b, c and d show the values of FIGS. 12A, 12B, 12C and 12D, respectively, the signals g, h, i and j in FIG. 11 are shown in FIGS. 12E, 12F, 12G and 12H, respectively. These signals are produced as the division pattern information. The signals g, h, i and j correspond to 2×2 pixels division block, 4×4 pixels division block, 8×8 pixels division block and 16×16 pixels division block, respectively. The signal g is logic level "1" when the condition of a≧d is satisfied. The signal h is logic level "1" when the logic expression $\bar{g}$ (b≧a) is satisfied. The signal i is logic level "1" when the logic expression $\bar{g}.\bar{h}.$(c≧d) is satisfied. The signal j is logic level "1" when the logic expression $\bar{g}.\bar{h}.\bar{i}$ is satisfied.

In this example, the header generator 21-7 shown in FIG. 10 makes the operations shown in FIGS. 12I through 12L. In other words, the header generator 21-7 generates the signal shown in FIG. 12I on the basis of the signal H shown in FIG. 12F, the signal shown in FIG. 12J on the basis of the signal i shown in FIG. 12G, and the signal shown in FIG. 12K on the basis of the signal j shown in FIG. 12H. Then, the header generator 21-7 rearranges the signals shown in FIGS. 12I through 12K, and produces header data shown in FIG. 12L on 8-bit output signal line.

In FIGS. 12A through 12L, one image is formed of one subblock. Of course, in this invention, one image may be formed of a plurality of subblocks.

The specific example described above with reference to FIGS. 5 through 12L can satisfy both the reduction of the coded data deterioration and the data amount control, but has the following problems.

As the compressed data generator 21 generates, in general, compressed data of the amount of the original image data using division blocks of a single block, four blocks and 16 blocks, the image data is always continuously read from the memory 1. However, the image input data having the high-frequency and large-brightness-difference part is divided with the 64 division blocks and converted into the approximate data and in order to quantize the approximate data, not only the reference quantized data ND but also EXT is needed. Thus, it is necessary to temporarily generate compressed data more than the compressed data corresponding to the amount of the original data that which is set forth. Therefore, during the period in which the header, ND and EXT are converted into compressed data by the mixer 21-8, the next part of the image data is temporarily stopped from being read from the memory 1. In addition, the compressed data is irregularly generated, and thus intermittently produced.

This phenomenon will be mentioned a little more specifically. The approximation of the luminance within the division block in the converter 2 normally needs ND of about 2 bytes (16 bits) in total for the four different coefficients A, B, C and D of the equation (4).

When the EXT which assumes 1 byte (8 bits) for all the four different coefficients A, B, C and D occurs in the image portion of which the least-significant division block size for adaptation is necessary to be reduced to 2×2 for keeping a spatial resolution, the ND has 2 bytes, and the EXT has 4 bytes (32 bits). Since the variable-length quantized data (ND+EXT) is 6 bytes (48 bits), the compressed data has 4 bytes (32 bits) or more corresponding to the data amount of four pixels of the image data. In other words, the compressed data of a higher data rate than the original image must be generated.

The data amount of the whole image is reduced by compression processing, but this overflow temporarily occurs in the rapidly changing luminance part. In order to prevent the temporary data rate overflow, it is necessary to interrupt the input of the original data (input data 1). However, the temporary stop of the original data input causes the disadvantage that the image data of a constant amount cannot be processed in a consistent time. In other words, when a moving image is compressed and recorded, the compressed data amount is controlled to be constant, but the processing time necessary for the compression coding of one image is not constant. Thus, it exceeds a predetermined recordable time which is determined by the limitation of VTR or the like, so that the compressed moving image cannot be continuously recorded.

In the specific example mentioned with reference to FIGS. 5 through 12L, although the decoded data deterioration can be reduced with the coded data amount kept constant, the data rate of the compressed data after coding is momentarily changed, and thus the input image data of the same size are completely processed in a different time. Thus, the compressed, coded moving image data cannot be recorded on a recording medium such as the digital VTR of D-2 which operates at a constant rate.

Another specific example of the data coding apparatus of FIG. 1 which can process image data at a constant rate, or remove the above problem will be described with reference to FIGS. 13 through 16.

Figure 13:
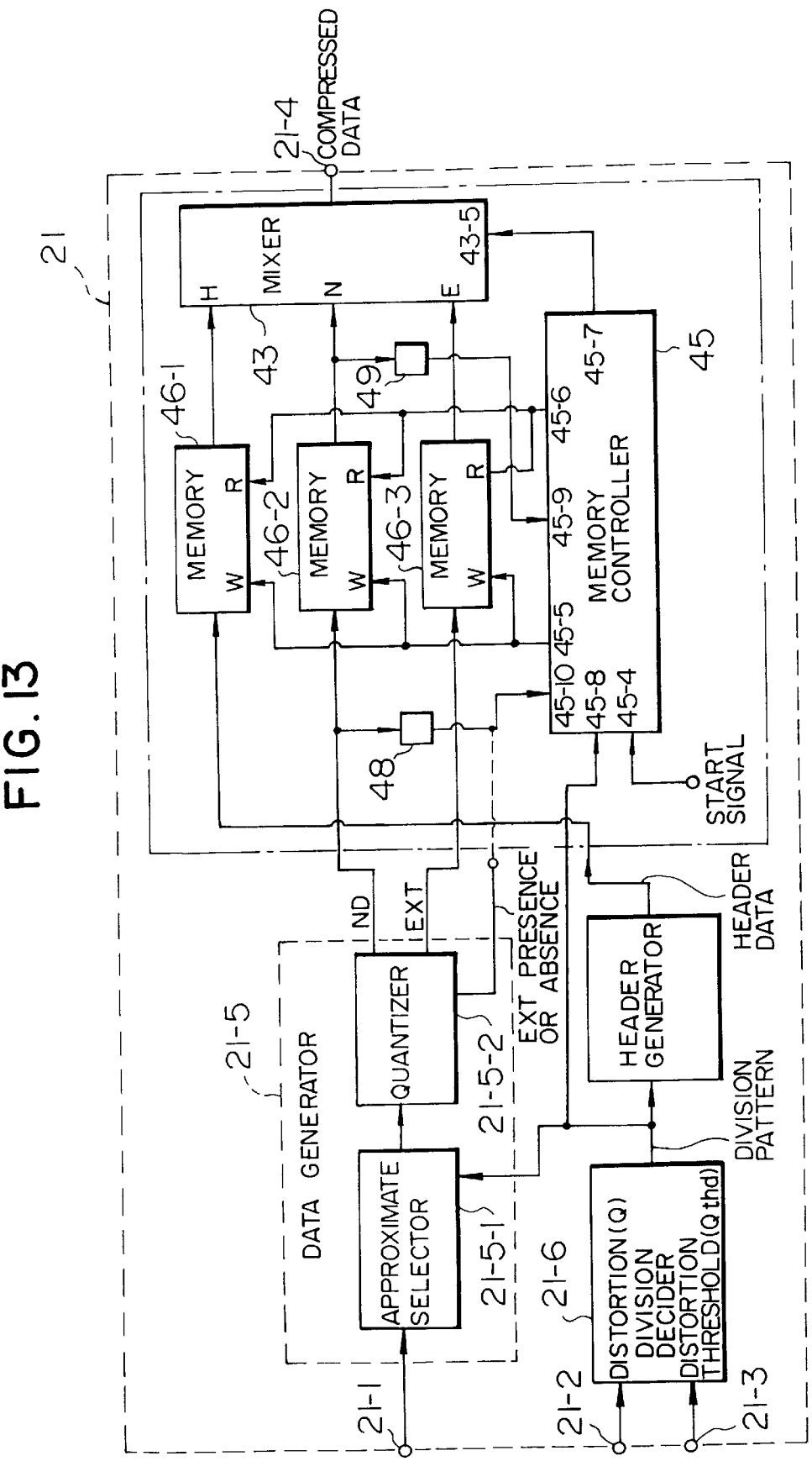
FIG. 13 is a block diagram of another example of the construction of the compressed data generator shown in FIG. 1.

This specific example is different from the previous example in that the arrangement of FIG. 10 of the compressed data generator 21 in FIG. 1 is replaced by the arrangement of FIG. 13. In FIG. 13, like elements corresponding to those in FIG. 10 are identified by the same reference numerals and will not be described. In FIG. 13, the elements different from those in FIG. 10 are surrounded by one-dot chain lines in FIG. 13.

In this embodiment, as shown in FIG. 13, the header output terminal of the header data generator 21-7 is connected to the data input terminal of an FIFO memory 46-1 as a buffer memory. The ND output terminal and EXT output terminal of the quantizer 21-5 are connected to the input terminals of FIFO memories 46-2 and 46-3, respectively. The output terminals of the FIFO memories 46-1, 46-2 and 46-3 are connected to the header input terminal, ND input terminal and EXT input terminal of a mixer 43. The EXT presence/absence output terminal of the quantizer 21-5 is connected to the input terminal, 45-8 of a memory controller 45. In addition, the ND output terminal of the quantizer 21-5-2 is connected to the input terminal of an EXT presence/absence detector 48, and the output terminal of the EXT presence/absence detector 48 is connected to the control terminal, 45-10 of the memory controller 45. The write control terminals of the FIFO memories 46-1, 46-2 and 46-3 are connected to the control terminal, 45 of the memory controller 45. The read control terminals of the FIFO memories 46-1, 46-2 and 46-3 are connected to the control terminal 45-6 of the memory controller 45. The data output terminal of the FIFO memory 46-2 is also connected to the input terminal of an EXT presence/absence detector 49. The output terminal of the EXT presence/absence detector 49 is connected to the control terminal 45-9 of the memory controller 45. The-mixing control terminal, 45-7 of the memory controller 45 is connected to the switching control terminal, 43-5 of the mixer 43. A start signal from the system controller 20 is supplied to the control terminal 45-4 of the memory controller 45, starting it to operate.

In this embodiment, the terminals EN in FIG. 1 are omitted.

The operation of the compressed data generator 21 shown in FIG. 13 will be described in brief. For convenience of explanation, the header has 4 bytes, ND has 2 bytes, and EXT has 4 bytes. Since EXT is not added to all the NDs, the ND itself is set so that it can be added with information indicative of the presence or absence of EXT. As a specific example, it is assumed that the ND is expressed in a total of n+1 bits of one bit of sign bit+n bits of absolute value. In this case, when all the n bits of absolute value within ND are "1 1 ... 1", EXT can be determined to be necessary. The header data is stored in the FIFO memory 6-1, ND in the FIFO memory 46-2, and EXT in the FIFO memory 46-3. When EXT occurs in the division blocks of 2×2 pixels size which have a higher rate than the original image data, the ND and EXT are simultaneously written in the FIFO memories 46-2 and 46-3, respectively. When the 256 bytes of the 16×16 data within the fundamental block is most properly divided into 64 2×2 size blocks each having 4 bytes of EXT, the processing operation of the mixer 43 for generating compressed data of 388 bytes including header of 4 bytes, ND of 128 bytes and EXT of 256 bytes is completed when the EXT of 256 bytes is written in the FIFO memory.

A constant time after data of a constant amount is completely written, reading of each FIFO memory is started. When the contents of the FIFO memories 46-1, 46-2 are read, and when the EXT presence/absence detector 49 detects the presence of EXT of the absolute value of "1 1 . . . 1" in the ND data read from the FIFO memory 46-2, the FIFO memory 46-3 is read for the EXT data. By the repetition of this operation, the reading operation of the memory 1 is separated from the compressed data generation of the mixer 43. As a result, it is not necessary that the reading operation of the memory 1 be temporarily stopped. The data within the FIFO memory are successively supplied to the mixer 43, so that the compressed data can be generated at a constant speed.

The operation of the compressed data generator 21 shown in FIG. 13 will be described in detail. The EXT presence/absence detectors 48, 49 generate "1" when supplied with ND data of which the absolute value part is "1 1 ... 1". The FIFO memories 46-1, 46-2, 46-3 receive the data signals at the data input terminals when supplied with "1" at the write control terminals. Also, the FIFO memories 46-1, 46-2, 46-3 produce at the data output terminals the stored data in the written order when supplied-with "1" at the read control terminals.

The memory controller 45, when supplied with the start signal from the system controller 20, initializes each FIFO as a buffer memory, causes each FIFO to stand by. When the division pattern information is obtained from the division decider 21-6, the write control signal is supplied to the FIFO 46-1, 46-2 in synchronism with the generation of the header data and ND. The EXT presence/absence detector 48 examines if EXT is present or absent in the ND output at the ND output terminal of the quantizer 21-5-2.

When EXT is present, the memory controller 45 supplies "1" to the write terminal of the FIFO 46-3, ordering the FIFO 46-3 to receive the EXT data from the quantizer 21-5-2. A constant time thereafter, the system controller 20 orders the mixer 43 and memory controller 45 to read and generate compressed data. The ordered memory controller 45 first supplies the read control signal to the FIFO 46-1, causing it to generate header data and to supply it to the mixer 43. The mixer 43 selects the header input and produces header data as compressed data.

Then, the memory controller 45 supplies to the FIFO 46-2 the control signal which becomes "1" during the time proportional to the amount of data to be read. This FIFO 46-2 produces the ND data when supplied with the control signal. The mixer 43 successively selects ND input and produces compressed data. In this case, the EXT presence/absence detector 49 examines if EXT is present or not in the ND output from the FIFO 46-3. The memory controller 45 decides whether the FIFO 46-3 is required to read in accordance with the result of the examination. If EXT is present, the read control signal is supplied to the buffer memory 46-3, controlling it to produce EXT data. Then, the header data of the next block is produced from he FIFO 46-1.

If EXT is absent, The FIFO 46-3 is not read, but instead the header data of the next block is produced directly from the FIFO 46-1. The memory controller 45 controls each FIFO in this way, and 5 generates a signal for controlling the mixer 43.

Consequently, the EXT input is selected at a proper time, and the header, ND and EXT as the fundamental data of compressed data are supplied from the FIFO 46-1, 46-2, 46-3 to the mixer 43. The mixer 43 continues to produce compressed data. The FIFOs 46-1, 46-2, 46-3 are not read at a time, but any one of them is read. On the other hand, since ND and EXT are generated at a time upon writing, the FIFOs 46-2 and 463 are written one at a time.

While the EXT generated from the quantizer 21-5-2 is detected by the EXT detector 48 and fed to the memory controller 45, the signal indicative of EXT present information directly from the terminal of the quantizer 21-5-2, if possible, may be supplied to the memory controller 45 so that the write control signal is supplied from the memory controller 45 to the FIFO 463. In that case, of course, the discrete EXT detector 48 is not necessary.

Figure 14:
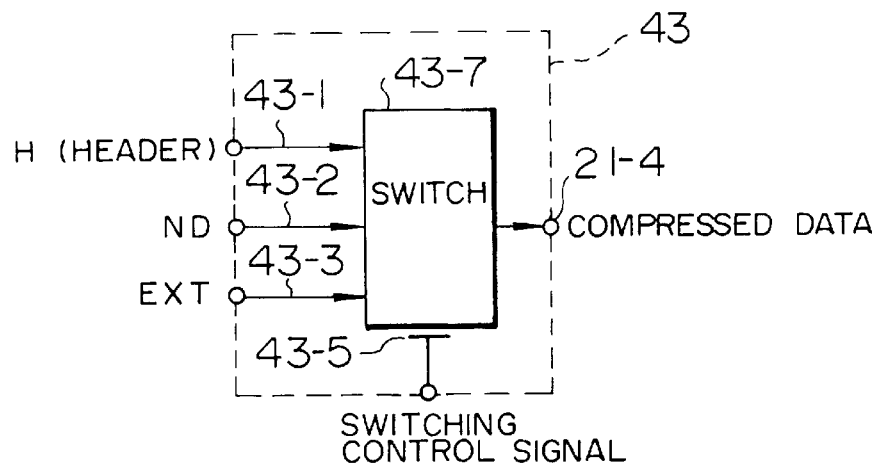
FIG. 14 is a block diagram of one example of the construction of the mixer shown in FIG. 13.

FIG. 14 shows one example of the construction of the mixer 43. The header data is supplied to the terminal, 43-1 of a switch 43-7, ND information to the terminal, 43-2 of the switch 43-7, EXT information to the terminal, 43-3 of the switch 43-7, and the switch control signal to the control terminal, 43-5 of the switch 43-7. The operation of the mixer 43 will be described below. The switch 43-7 is controlled to select any one of the signals at the terminals 43-1, 43-2 and 43-3 and produce compressed data in accordance with the signal fed to the control terminal 43-5.

Figure 15:
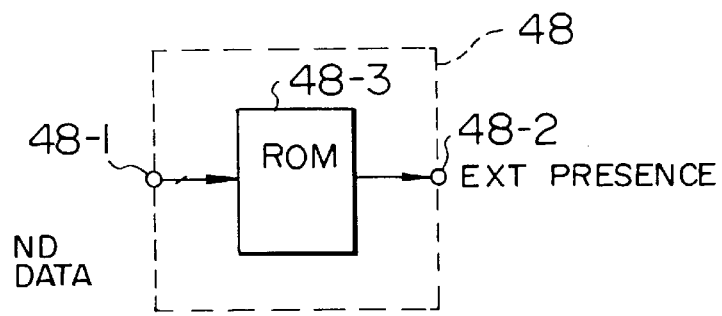
FIG. 15 is a block diagram of one example of the construction of the EXT detector shown in FIG. 13.

FIG. 15 shows one example of the construction of the EXT presence/absence detector 48. The input terminal, 48-1 is connected to the address terminal of a ROM 48-3, and the data terminal of the ROM 48-3 to the output terminal, 48-2. The ROM 48-3 selects elements having an address bit length corresponding to the bit length of ND data or above, and it writes "1" only in the data of the absolute value of "1 1 . . . 1", and "0" in the other part. Thus, when ND information which needs EXT is caused and fed to the ROM address, the ROM 48-3 produces "1" at the data terminal and EXT presence information at the output terminal 48-2. Therefore, EXT presence or absence can be detected.

Figure 16:
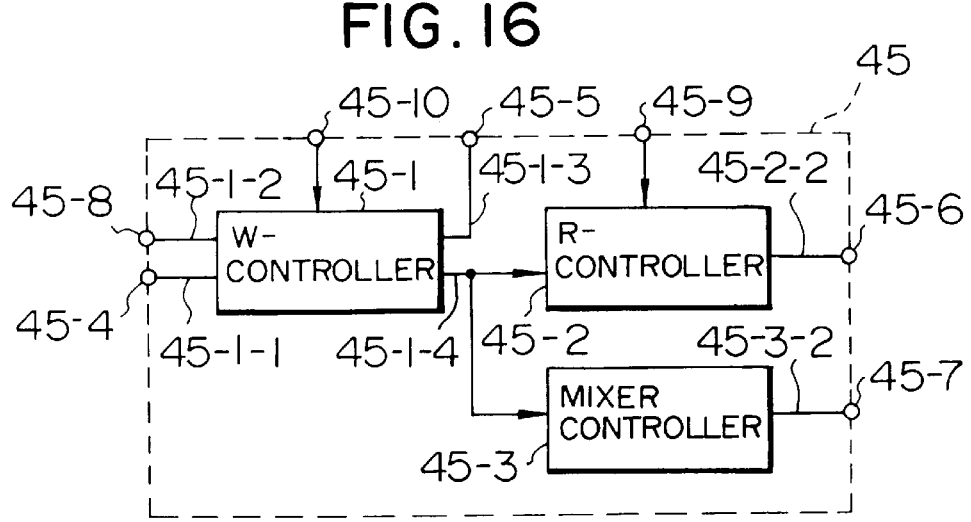
FIG. 16 is a block diagram of one example of the construction of the memory controller shown in FIG. 13.
Figure 17:
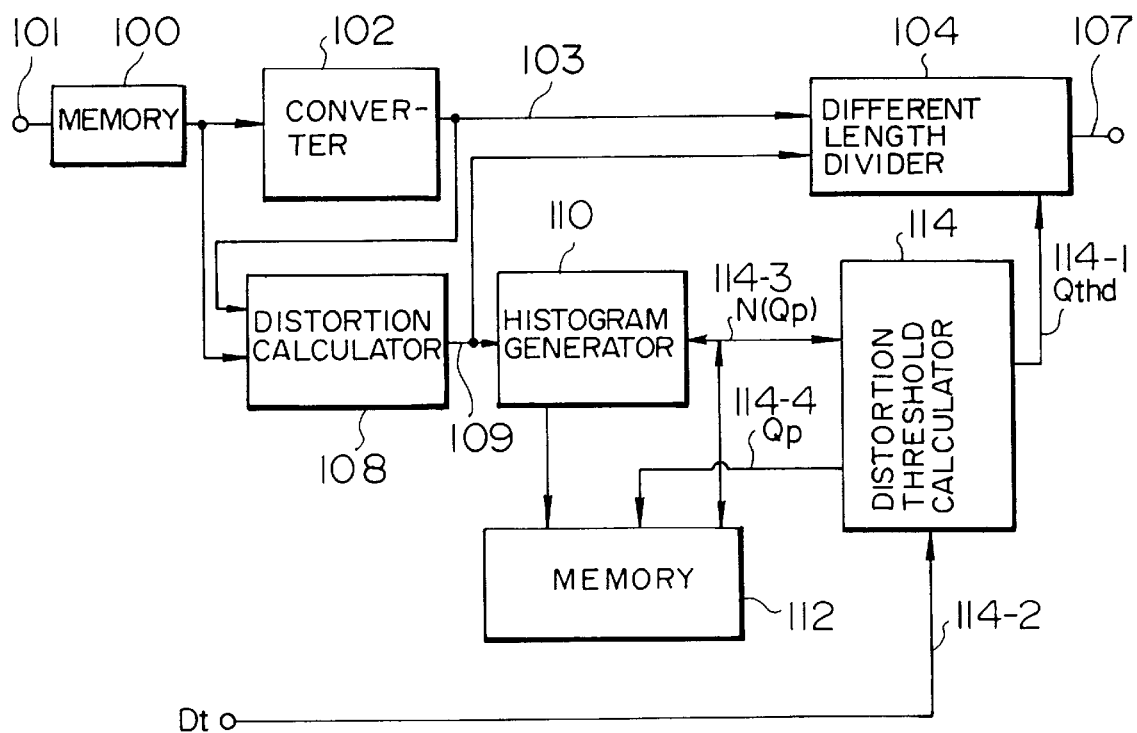
FIG. 17 is a block diagram of the whole construction of a conventional data coding apparatus.
Figure 18A:
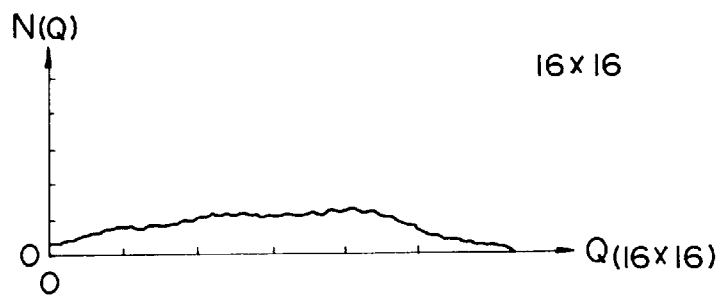
FIGS. 18A through 18C are graphs conceptually showing histogram information which is used in the conventional data coding apparatus.
Figure 18B:
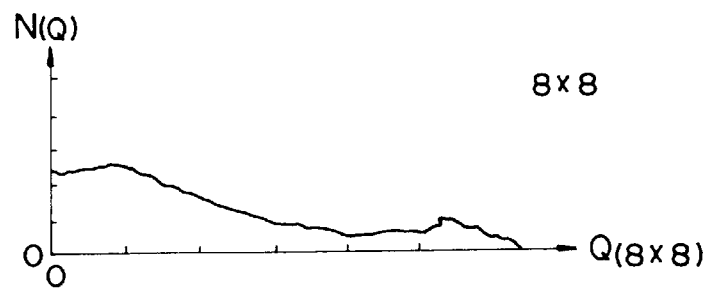
Figure 18C:
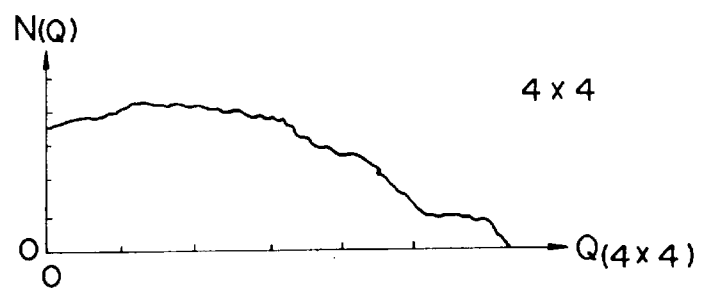

FIG. 16 shows one example of the construction of the memory controller 45. The memory controller 45 includes a W-controlling portion 45-1, an R-controlling portion 45-2 and a mixer controlling portion 45-3. The W-controlling portion 45-1 is connected to the input terminals, 45-4, 45-8, 45-10 and output terminal 45-5. The read start signal, 45-1-4 from the W-controlling portion 45-1 is supplied to the start indication input terminals of the R-controlling portion 45-2 and mixer controlling portion 45-3. The R-controlling portion 45-2 is connected to the input terminal, 45-9 and the output terminal, 45-6. The mixer controlling portion 45-3 is connected to the output terminal, 45-7.

The start signal, 45-1-1 from the system controller 20 is supplied through the input terminal 45-4 to the W-controlling portion 45-1, which, a constant time after, generates a read start signal 45-1-4. The division pattern information from the division decider 21-6 is fed through the input terminal 45-8 as a division pattern information signal 45-1-2. Also, the EXT presence information from the terminal 45-10 is supplied to the W-controlling portion 45-1. The write control signal to the FIFO memories 46-1, 46-2, 46-3 is fed from the W-controlling portion 45-1 through the output terminal 45-5. Thus, the indefinite-rate header, ND and EXT information are stored in the FIFO memories 46-1, 46-2, 46-3 as buffer memories at an indefinite rate. The W-controlling portion 45-1, a constant time after, produces a read-start indication signal 45-1-4.

Thus, the R-controlling system 45-2 generates a read control signal 45-2-2 and supplies it through the terminal 45-6 to the FIFO memories 46-1, 46-2, 46-3. Therefore, the header, ND and EXT data are read therefrom at a constant rate. The mixer controlling portion 45-3 is supplied with the read-start indication signal 45-1-4 from the W-controlling portion 45-1 and generates at the output terminal 45-7 a switching control signal 45-3-2 for controlling the operation of the mixer 43.

In this embodiment, the EXT presence information is detected by the EXT detector 48. When the EXT presence information is produced from the terminal of the quantizer 21-5-2 as shown in FIG. 13, the EXT detector 48 is not added, but the EXT presence/absence output terminal of the quantizer 21-5-2 is connected to the terminal 45-10 of the memory controller 45.

According to the embodiments mentioned above, the original data output is not interrupted and the compressed data is not intermittently generated. Only by adding buffer memories, is it possible to realize a higher-performance compressing apparatus capable of operating at a constant rate for the variable-length code and thus removing the above disadvantage.

This invention is not limited to the above embodiments. For example, the input data 1 may be other data than image data. While one image unit is used in the above embodiments, the unit of data to be processed is not limited, but may be a ½ image unit or one subblock unit. The hierarchical division block structure is not limited to the example shown in FIGS. 3A through 3D. For example, the number of hierarchical structures may be $2^n$, where n is 1,2,3. While the EXT is of a fixed length in the above embodiments, the EXT may be of a variable length. In that case, for example, the EXT may be expressed by any one of the three expressions, EXT1, EXT1+EXT2, and EXT1+EXT2+EXT3. The EXT1, EXT2 and EXT 3 are fixed length data. Moreover, while approximate data is obtained by use of a bilinear function in the above embodiments, it may be obtained by other approximation methods.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A data coding method for obtaining coded data by processing image input data in a unit of a predetermined block, said method comprising the steps of:

converting said image input data within each of a plurality of division blocks into approximate data, said division blocks being within a predetermined hierarchical division block structure and each division block having the same number of pixels;

obtaining a distortion value indicative of an error between decoded data to be obtained by decoding said approximate data associated with each of said division blocks, and said image input data within corresponding ones of said division blocks being associated with said decoded data;

obtaining a variable-length quantized data, an additional quantized data EXT and a reference quantized data ND associated with said approximate data in each of said division blocks;

obtaining increment/decrement information indicating a value expressed by ES–El, El indicating the additional quantized data associated with the predetermined division blocks, Es indicating the additional quantized data associated with the less-significant division block other than said predetermined division blocks;

obtaining histogram information based on said distortion value and said increment/decrement information, said histogram information indicating the number of said division blocks of each hierarchical level within said predetermined block as parameters of said distortion value and said increment/decrement information;

obtaining a distortion threshold value on the basis of said histogram information;

obtaining division pattern information for selecting said respective division blocks which satisfies a first condition that said distortion value is less than a predetermined distortion threshold value, a second condition that one image is covered by said division blocks without overlap, and a third condition a more significant division block is selected when said distortion values produced from each of said division blocks are the same;

converting said approximate data into variable-length quantized data, said approximate data being associated with said selected division blocks on the basis of said division pattern information;

generating header data indicating said division blocks corresponding to said variable-length quantized data on the basis of said division pattern information; and obtaining said coded data by combining said variable-length quantized data and said header data, wherein said distortion threshold value is selected so that the amount of said coded data is substantially coincident with a specified data amount.

2. A data coding method according to claim 1, wherein said step for obtaining said coded data includes the steps of:

storing said fixed-length reference quantized data included in said variable-length quantized data into first buffer memory means;

storing said additional quantized data associated with said approximate data included in said variable-length quantized data into second buffer memory means;

combining said reference quantized data stored in said first buffer memory means, with said additional quantized data associated with said approximate data stored in said second buffer memory means.

3. A data coding apparatus for obtaining coded data by processing image input data in a unit of a predetermined block, comprising:

means for converting said image input data within each of a plurality of division blocks into approximate data, said division blocks being within with a predetermined hierarchical division block structure and each division block having a same number of pixels;

means for obtaining a distortion value indicative of an error between encoded data to be obtained by decoding said approximate data associated with each of said division blocks, and said image input data corresponding to ones of said division blocks;

means for obtaining a variable-length quantized data an additional quantized data EXT and a reference quantized data ND associated with said approximate data in each of said division blocks;

means for obtaining increment/decrement information indicating a value expressed by Es–El, El indicating the additional quantized data associated with the predetermined division blocks, Es indicating the additional quantized data associated with the less significant ones other than said predetermined division blocks;

means for obtaining histogram information based on said distortion value and said increment/decrement information, said histogram information indicating the number of said division blocks of each hierarchical level within said predetermined block as parameters of said distortion value and said increment/decrement information;

means for obtaining a distortion threshold value on the basis of said histogram information;

means for obtaining division pattern information for selecting said respective division blocks which satisfies a first condition that said distortion value is less than a predetermined distortion threshold value, a second condition that one image is covered by said division blocks without overlap, and a third condition a more significant division block is selected when said distortion values produced from each of said division blocks are the same;

means for converting said approximate data into variable-length quantized data, said approximate data being associated with said selected division blocks on the basis of said division pattern information;

means for generating header data indicating said division blocks corresponding to said variable-length quantized data on the basis of said division pattern information; and means for obtaining said coded data by combining said variable-length quantized data and header data, wherein said distortion threshold value is selected so that the amount of said coded data is substantially coincident with a specified data amount.

4. A data coding apparatus according to claim 3, wherein said means for obtaining said coded data includes:

means for storing said fixed-length reference quantized data included in said variable-length quantized data into first buffer memory means;

means for storing said additional quantized data associated with said approximate data included in said variable-length quantized data into second buffer memory means;

means for storing said header data in third buffer memory means; and means for combining said reference quantized data stored in said first buffer memory means, with said additional quantized data associated with said approximate data stored in said second buffer memory means.

5. A new coding method for obtaining coded data by dividing image input data into a plurality of division blocks, said method comprising the steps of:

quantizing approximate data associated with the divided image input data in each of said division blocks, said division blocks constituting a hierarchical block structure, to produce variable-length quantized data;

detecting an increment/decrement value expressed by Es–El, El indicating the additional quantized data associated with the predetermined division blocks, Es indicating the additional quantized data associated with the less-significant division blocks other than said predetermined blocks;

decoding said approximate data;

obtaining a distortion value indicative of an error between decoded data to be obtained by decoding said approximate data associated with each of a plurality of said division blocks and said image input data;

obtaining histogram information based on said distortion value and said increment/decrement information;

obtaining a relationship between the amount of said coded data and said distortion value based on said histogram information;

detecting the distortion value when a predetermined data amount is substantially coincident with the amount of said coded data, based on said relationship between the amount of said coded data and said distortion value; and selecting one of said division blocks so that said distortion value indicative of an error between said decoded data and said input data is smaller than said distortion value associated with said predetermined data amount.

6. A data coding method for obtaining coded data by processing image input data in a unit of a predetermined block, said method comprising the steps of:

converting said image input data in each of a plurality of division blocks into approximate data;

decoding said approximate data;

obtaining a distortion value indicative of an error between the decoded approximate data associated with each of said division blocks and said image input data in the division block associated with the decoded approximate data;

obtaining variable-length quantized data including quantized data EXT associated with said approximate data and fixed-length reference quantized data ND associated with said approximate data in each of said division blocks;

obtaining increment/decrement information associated with each of said division blocks, said increment/decrement information being a value expressed by Es–El, El being the amount of quantized data EXT associated with one of said division blocks and Es being the amount of quantized data ND associated with smaller ones of said division blocks;

obtaining histogram information based on said distortion value and said increment/decrement information;

obtaining a distortion threshold value based on said histogram information;

obtaining division pattern information for selecting said respective division blocks which satisfies a first condition that said distortion value is less than a predetermined distortion threshold value, a second condition that one image is covered by said division blocks without overlap, and a third condition a more significant division block is selected when said distortion values produced from each of said division blocks are the same;

converting said approximate data into variable-length quantized data, said approximate data being associated with said selected division blocks on the basis of said division pattern information;

generating header data indicating said division blocks corresponding to said variable-length quantized data on the basis of said division pattern information; and obtaining said coded data by combining said variable-length quantized data and said header data;

wherein said distortion threshold value is selected so that the amount of said coded data is substantially coincident with a predetermined data amount.

7. A data coding method according to claim 6, wherein said step for obtaining said coded data includes the steps of:

storing said fixed-length reference quantized data included in said variable-length quantized data into first buffer memory means;

storing said quantized data associated with said approximate data included in said variable-length quantized data into second buffer memory means; and combining said reference quantized data stored in said first buffer memory means, said quantized data associated with said approximate data stored in said second buffer memory means, and said header data, said header data being stored in a third buffer memory means.

8. A data coding apparatus for obtaining coded data by processing image input data in a unit of a predetermined block, comprising:

means for converting said image input data in each of a plurality of division blocks into approximate data;

means for decoding said approximate data;

means for obtaining a distortion value indicative of an error between the decoded approximate data associated with each of said division blocks and said image input data in the division block associated with the decoded approximate data;

means for obtaining variable-length quantized data including quantized data EXT associated with said approximate data and fixed-length reference quantized data ND associated with said approximate data in each of said division blocks;

means for obtaining increment/decrement information associated with each of said division blocks, said increment/decrement information being a value expressed by Es−El, El being the amount of quantized data EXT associated with one of said division blocks and Es being the amount of quantized data ND associated with smaller ones of said division blocks;

means for obtaining histogram information based on said distortion value and said increment/decrement information;

means for obtaining a distortion threshold value based on said histogram information;

means for obtaining division pattern information for selecting said respective division blocks which satisfies a first condition that said distortion value is less than a predetermined distortion threshold value, a second condition that one image is covered by said division blocks without overlap, and a third condition a more significant division block is selected when said distortion values produced from each of said division blocks are the same;

means for converting said approximate data into variable-length quantized data, said approximate data being associated with said selected division blocks on the basis of said division pattern information;

means for generating header data indicating said division blocks corresponding to said variable-length quantized data on the basis of said division pattern information; and means for obtaining said coded data by combining said variable-length quantized data and said header data;

wherein said distortion threshold value is selected so that the amount of said coded data is substantially coincident with a predetermined data amount.

9. A data coding apparatus according to claim 8, wherein said means for obtaining said coded data includes:

means for storing said quantized data fixed-length reference included in said variable-length quantized data into first buffer memory means;

means for storing said associated with said approximate data quantized data included in said variable-length quantized data into second buffer memory means;

means for storing said header data in third buffer memory means; and means for combining said reference quantized data stored in said first buffer memory means, said quantized data associated with said approximate data stored in said second buffer memory means, and said header data, said header data being stored in a third buffer memory means.

10. A data coding apparatus according to claim 8, wherein said input data is image data.

11. A data coding method for obtaining coded data by dividing image input data with a plurality of division blocks, said method comprising the steps of:

dividing said image input data into a plurality of blocks by a plurality of division blocks, each of which comprises a plurality of blocks having different sizes, to obtain an approximate data associated with said respective division blocks;

quantizing said approximate data to produce variable-length quantized data;

detecting an increment/decrement value expressed by $\Delta EXT$, wherein $\Delta EXT$ is a different value between additional quantized data which said image input data is quantized by two different division blocks;

decoding said approximate data;

obtaining a distortion value indicative of an error between decoded data to be obtained by decoding said approximate data associated with each of a plurality of said division blocks and said image input data;

obtaining histogram information based on said distortion value and said increment/decrement value;

obtaining a relationship between the amount of said coded data and said distortion value based on said histogram information;

detecting the distortion value when a predetermined data amount is substantially coincident with said amount of said coded data, based on said relationship between the amount of said coded data and said distortion value; and selecting one of said division blocks so that said distortion value indicative of an error between said decoded data and said image input data is smaller than said distortion value associated with said predetermined data amount.

12. A data coding method for obtaining coded data by processing image input data with a plurality of division blocks, said method comprising the steps of:

converting said image input data into approximate data by respective division blocks, each of which has a different size;

obtaining a distortion value indicative of an error between decoded data to be obtained by decoding said approximate data associated with each of said division blocks, and said image input data;

obtaining a variable-length quantized data consisting an additional quantized data EXT and a reference quantized data, in accordance with said respective division blocks;

obtaining increment/decrement information expressed by ES−El, wherein El indicates an additional quantized data in the case where said image input data is converted by the predetermined division block, and ES indicates an additional quantized data in the case wherein said image input data is converted by a division block, the number of divided blocks of which is larger than that of said predetermined division block;

obtaining histogram information based on said distortion value and said increment/decrement information, said histogram information indicating the number of the divided blocks of said respective division blocks;

obtaining a distortion threshold value on the basis of said histogram information;

obtaining a division pattern information for selecting at least one of said division blocks which satisfies a first condition that said distortion value is less than a predetermined distortion threshold value, a second condition that the image size of said image input data is covered by said division blocks without overlap, and a third condition that said division block, the number of the divided blocks of which is smallest, is selected when said distortion values produced from each of said division blocks are the same;

converting said approximate data into said variable-length quantized data, said approximate data being associated with said selected division blocks on the basis of said division pattern information;

generating header data indicating said division blocks corresponding to said variable-length quantized data on the basis of said division pattern information; and obtaining said coded data by combining said variable-length quantized data and said header data, wherein said distortion threshold value is selected so that the amount of said coded data is substantially coincident with a specified data amount.

13. A data coding method according to claim 12, wherein said step for obtaining said coded data includes the steps of:

storing said reference quantized data into first buffer memory means;

storing said additional quantized data into second buffer memory means; and combining said reference quantized data stored in said first buffer memory means, with said additional quantized in said second buffer memory.

14. A data coding apparatus for obtaining coded data by processing image input data with a plurality of division blocks, comprising:

means for converting said image input data with said respective division blocks into approximate data, said division blocks comprising a plurality of blocks having different sizes;

means for obtaining a distortion value indicative of an error between decoded data to be obtained by decoding said approximate data associated with each of said division blocks, and said image input data;

means for obtaining a variable-length quantized data consisting an additional quantized data EXT and a reference quantized data ND from said approximate data;

means for obtaining increment/decrement information expressed by ES−El, wherein El indicates an additional quantized data in the case where said image input data is converted by the predetermined division block, and ES indicates an additional quantized date in the case where said image input data is converted by a division block, the number of divided blocks of which is larger than that of said predetermined division block;

means for obtaining histogram information based on said distortion value and said increment/decrement information, said histogram information indicating the number of the divided blocks of said respective division blocks;

means for obtaining a distortion threshold value on the basis of said histogram information;

means for obtaining division pattern information for selecting at least one of said division blocks which satisfies a first condition that said distortion value is less than a predetermined distortion threshold value, a second condition that the image size of said image input data is covered by said division blocks without overlap, and a third condition that said division block, the number of the divided blocks of which is smallest, is selected when said distortion values produced from each of said division blocks are the same;

means for converting said approximate data into said variable-length quantized data, said approximate data being associated with said selected division blocks on the basis of said division pattern information;

means for generating header data indicating said division blocks corresponding to said variable-length quantized data on the basis of said division pattern information; and means for obtaining said coded data by combining said variable-length quantized data and said header data, wherein said distortion threshold value is selected so that the amount of said coded data is substantially coincident with a specified data amount.

15. A data coding apparatus according to claim 14, wherein said means for obtaining said coded data includes:

means for storing said reference quantized data into first buffer memory means;

means for storing said additional quantized data into second buffer memory means;

means for storing said header data in third buffer memory means; and means for combining said reference quantized data stored in said first buffer memory means, with said additional quantized data stored in said second buffer memory means.

* * * * *